(12) United States Patent
Sutcliffe

(10) Patent No.: US 7,889,853 B2
(45) Date of Patent: Feb. 15, 2011

(54) METHODS, SYSTEMS, DEVICES, AND PRODUCTS FOR PROVIDING RING BACKS

(75) Inventor: Geoff Sutcliffe, Kennesaw, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1244 days.

(21) Appl. No.: 10/899,925

(22) Filed: Jul. 27, 2004

(65) Prior Publication Data

US 2006/0023862 A1    Feb. 2, 2006

(51) Int. Cl.
  *H04M 3/42*  (2006.01)
  *H04M 1/00*  (2006.01)
  *H04M 3/00*  (2006.01)
(52) U.S. Cl. .............................. 379/207.16; 379/373.01
(58) Field of Classification Search .............. 379/88.17, 379/88.33, 142.01, 201.01, 207.02, 207.08, 379/377, 114.13, 373.01, 373.02, 373.03, 379/67, 211.01, 207.16; 370/310, 351–356, 370/329, 377; 455/567, 91
See application file for complete search history.

(56) References Cited

U.S. PATENT DOCUMENTS

| | | | |
|---|---|---|---|
| 4,850,007 A | 7/1989 | Marino et al. | |
| 5,539,809 A * | 7/1996 | Mayer et al. | ........... 379/210.02 |
| 5,652,784 A | 7/1997 | Blen et al. | |
| 5,742,905 A | 4/1998 | Pepe | |
| 5,852,657 A | 12/1998 | Malik | |
| 6,014,439 A | 1/2000 | Walker et al. | |
| 6,018,577 A | 1/2000 | Roach | |
| 6,038,305 A | 3/2000 | McAllister | |
| 6,085,101 A | 7/2000 | Jain | |
| 6,088,440 A | 7/2000 | Millar et al. | |
| 6,366,791 B1 * | 4/2002 | Lin et al. | ................... 455/567 |
| 6,385,308 B1 | 5/2002 | Cohen et al. | |
| 6,404,880 B1 | 6/2002 | Stevens | |
| 6,418,330 B1 | 7/2002 | Lee | |
| 6,567,658 B1 | 5/2003 | Van De Graaf | |
| 6,574,335 B1 | 6/2003 | Kalmanek | |
| 6,603,844 B1 | 8/2003 | Chavez et al. | |
| 6,608,891 B1 | 8/2003 | Pelletier et al. | |
| 6,665,390 B1 | 12/2003 | Ekstrom | |
| 6,694,429 B1 | 2/2004 | Kalmanek | |
| 6,778,648 B1 | 8/2004 | Alston | |
| 8,807,255 | 10/2004 | Alston | |
| 6,829,233 B1 | 12/2004 | Gilboy | |
| 6,856,673 B1 | 2/2005 | Banks et al. | |

(Continued)

OTHER PUBLICATIONS

John Tagliabue, "Europe Offering Free Calls But First a Word From . . . ", New York Times, Sep. 28, 1997.

(Continued)

*Primary Examiner*—Ahmad F Matar
*Assistant Examiner*—Sonia Gay
(74) *Attorney, Agent, or Firm*—Scott P. Zimmerman PLLC

(57) ABSTRACT

Methods, systems, devices, and products are disclosed for providing ring backs to a calling party's communications device. The ring backs are selected by the called party and can be delivered to the calling party in many ways, such as by delivering a file, a pointer, or a command. The ring backs allow the called party to personalize the experience for a calling party when that calling party attempts a communication with the called party. The ring backs can be audio, visual, tactile or any such combination.

18 Claims, 17 Drawing Sheets

U.S. PATENT DOCUMENTS

| | | | |
|---|---|---|---|
| 7,088,815 B2 * | 8/2006 | MacNamara et al. | 379/373.01 |
| 7,305,256 B2 * | 12/2007 | Elliott | 455/567 |
| 7,602,901 B1 * | 10/2009 | Kates et al. | 379/373.01 |
| 2002/0114437 A1 | 8/2002 | Nabkel et al. | |
| 2002/0131574 A1 | 9/2002 | Alleman | |
| 2003/0002657 A1 | 1/2003 | Seelig et al. | |
| 2003/0086558 A1 | 5/2003 | Seelig et al. | |
| 2004/0102163 A1 * | 5/2004 | Seki | 455/91 |
| 2004/0105534 A1 * | 6/2004 | Dezonno | 379/114.13 |
| 2004/0114732 A1 * | 6/2004 | Choe et al. | 379/88.17 |
| 2004/0120494 A1 * | 6/2004 | Jiang et al. | 379/210.01 |
| 2004/0131048 A1 * | 7/2004 | Cook et al. | 370/352 |
| 2004/0174966 A1 * | 9/2004 | Koch | 379/88.22 |
| 2004/0174983 A1 * | 9/2004 | Olschwang et al. | 379/377 |
| 2005/0094796 A1 * | 5/2005 | Beauford | 379/211.01 |
| 2005/0105706 A1 * | 5/2005 | Kokkinen | 379/201.01 |
| 2005/0117726 A1 * | 6/2005 | DeMent et al. | 379/142.01 |
| 2005/0174966 A1 * | 8/2005 | Lansford et al. | 370/329 |
| 2005/0259604 A1 * | 11/2005 | Salmi | 370/310 |
| 2007/0230678 A1 | 10/2007 | Bloebaum et al. | |

OTHER PUBLICATIONS

U.S. Appl. No. 11/040,509, filed Jan. 21, 2005, O'Neil et al.
U.S. Appl. No. 11/025,230, filed Dec. 29, 2004, Stephens et al.
http://www.tetcotechnologies.com/tetco/us/4050.html.
U.S. Appl. No. 11/025,230, filed Dec. 29, 2004, Stephens.

* cited by examiner

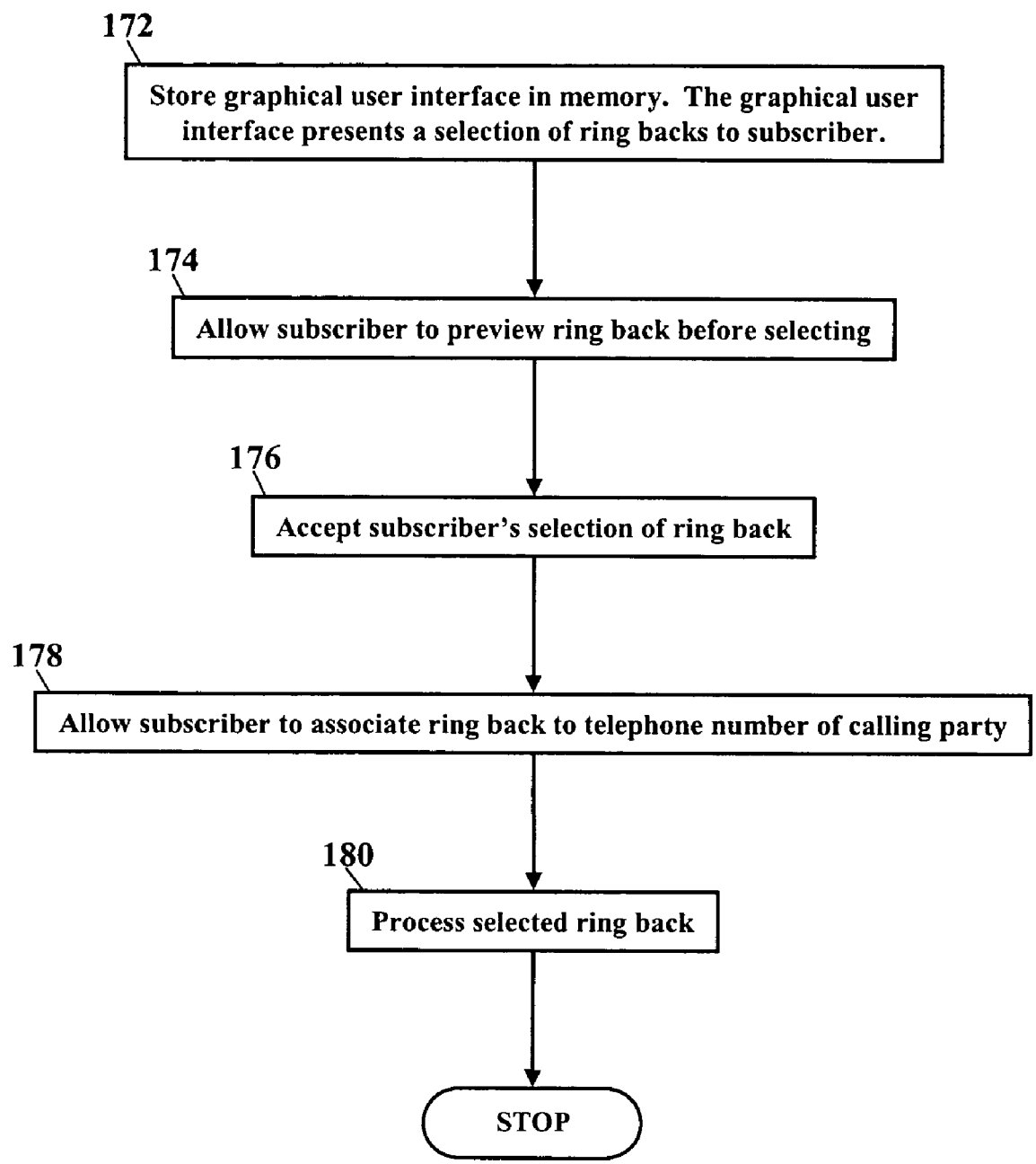

METHODS, SYSTEMS, DEVICES, AND PRODUCTS FOR PROVIDING RING BACKS

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to systems, methods, devices, and products for providing communications and, more particularly, to systems, methods, devices, and products for providing ring backs to a calling party's communications device with the ring backs being selected by the called party.

2. Description of the Related Art

Mobile phones, such as cellular phones, have become an integral part of our society. Mobile phones have not only become standard equipment for the employees of many businesses, but have also been widely adopted for personal use. In fact, within a single household, it is likely that more than one family member will possess a mobile phone.

Because of the prevalence of mobile phones in our society, the sound of a mobile phone ringing in a public place is common background noise. Previously, when many mobile phones had the same ring, when one person's mobile phone started to ring many people would check their phones to see if it was their phone that was ringing. Partly because of this problem and also because of people's desire to personalize their phone, mobile phones now allow the user to select a ring tone from a list of ring tones stored in the phone. Recently users can even download songs and other ring tones from their mobile phone service provider or from a third party providing of ring tones to further personalize their phones. Thus, users are no longer limited to the list of ring tones stored in their phone but can select from an almost unlimited number of ring tones. Users desire these personalized features, and these personalized features are profitable for the service provider and for the third party providers of the ring tones.

Typically, when a calling party initiates a communication with a called party, the calling party experiences a wait time during which time the calling party hears a standard ring tone or, if the line is busy, the standard busy signal. Some companies have recently allowed the calling party to personalize their communication experience during this wait time. Rather than hearing the standard ring, the calling party can select a ring-back. For example, Tetco Technologies of Asnieres-sur-Seine, France, offer a Ring@Tone service that allows the calling party to select music, joke, a corporate message, or other ring-backs during this wait time. A description of this Ring@Tone service can be found at http://www.tetcotechnologies.com/tetco/us/4050.html and in "Color Ring-Back: Personalized Services for Increased Revenue," February 2004, both of which are incorporated herein by reference. Alcatel also announced a Personalized Ring Back Tone (PRBT) solution that allows users to have a more entertaining experience when operating their mobile phone. U.S. Pat. No. 6,574,335 to Kalmanek, Jr. et al. also provides a description of a ring back service, which is incorporated herein by reference.

BRIEF SUMMARY OF THE INVENTION

A ring back service according to one embodiment of the invention allows a called party to influence a ring back delivered to the calling party during the wait time. Whereas ring backs could be selected by the calling party, the ring back service enables the called party to select the ring back. This ring back service can be personalized by the called party, and this ring back service provides an additional revenue opportunity for the called party's service provider, the calling party's service provider, ring back providers, and for any party facilitating the ring back service. This ring back service provides an entertaining experience to a calling party. The ring back is provided during the wait time when the called party's communications device is ringing, vibrating, or otherwise alerting to an incoming telephone call, email, or other communication. As most people know, when a telephone call is placed, the calling party hears a "ring back" tone. This ring back tone indicates the called party's terminal is ringing, or otherwise alerting, to the incoming telephone call. This ring back service allows the called party to select the ring back heard by the calling party. That is, the called party uses this ring back service to determine the type of ring back heard by the calling party. The ring back can have audio, visual such as images or video, and/or tactile feedback to the calling party. For instance, the calling party might hear a favorite song, view a picture, view portions of a movie, or see other graphics. The called party might even select personal pictures, self-composed music, and/or streamed audio and/or video content (such as radio, stock quotes, news, weather, and/or advertisements). The called party might also specify ring backs by electronic calendar entries, such as the day of the week, the time of day, and/or appointments in the calendar. The called party subscriber may even associate particular ring backs to particular calling parties, thus providing a variety of personalized ring backs.

This ring back service also provides a revenue opportunity for service providers. The called party may be charged a monthly fee for this ring back service and/or the calling party may be charged a monthly fee for the ring back service. The called party and/or calling party may additionally or alternatively be charged a nominal fee per each personalized ring back. Ring back providers could also realize revenue by providing a selection of ring backs to the called party and/or the general public, and more revenue could be realized from a nominal fee for each downloaded ring back. A provider of the ring back service, which could be separate from the communications service provider, may also charge a fee for enabling the ring back service. The calling party, too, may be charged a fee for receiving/processing the personalized ring back.

Various methods and systems according to the invention provide the ring back to the calling party. For example, one method retrieves the ring back from memory within the communication device. The ring back is selected by the called party for presentation to the calling party. That is, the called party may specify the ring back to be presented on the calling party's communications device. The ring back indicates the called party's communications device is ringing and/or otherwise alerting to an incoming communication. The ring back is then communicated to the calling party.

According to another embodiment, a method of providing a ring back to a calling party involves delivering the ring back via a communications network for presentation on the calling party's communications device. The ring back is selected by a called party and indicates the called party's communications device is alerting of an incoming communication. The ring back may be received as a data file, and the data file specifies the ring back to be presented. Rather than receiving the entire data file, the ring back may also be received as an indicator of the ring back to be retrieved from memory.

According to yet another embodiment, a method of providing a ring back communications service provides a selection of ring backs to the called party and the called party's selection of a ring back is accepted. The called party may be allowed to preview the ring back, and the preview allows the called party to experience the ring back before selection. That is, the called party may hear, see, and/or feel the previewed ring back. The called party may even smell and/or touch the ring back, if those features are available. The selection of ring backs may be presented using a graphical user interface (GUI) stored in memory. This GUI allows the called party to select the ring back stored within the communication device, stored locally at another piece of communication equipment, or stored remotely, such as at a server on the Internet.

According to yet another embodiment, a system for providing a ring back includes a Ring Back Module stored in a memory device and a processor that communicates with the memory device. The Ring Back Module provides a selection of ring backs to the called party. The Ring Back Module accepts the called party's selection of a ring back.

Other systems, methods, devices, and/or computer program products according to embodiments will be or become apparent to one with ordinary skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

These and other features, aspects, and advantages of the present invention are better understood when the following Detailed Description of the Invention is read with reference to the accompanying drawings, wherein:

FIG. 18 is a flowchart illustrating a method of providing a ring back communications service to a subscriber.

DETAILED DESCRIPTION OF THE INVENTION

Figure 1:
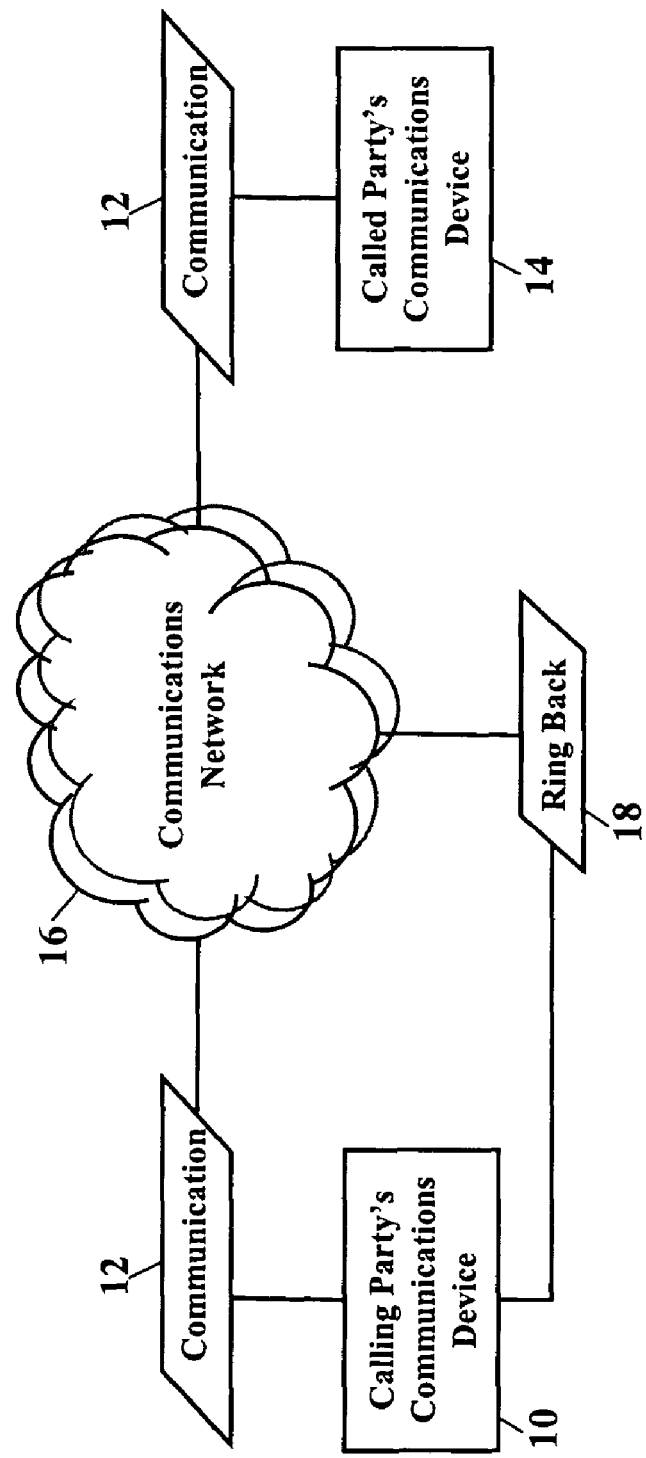
FIG. 1 is a simplified schematic of a network providing a ring back service, according to the embodiments of the invention.

Embodiments of the invention now will be described more fully hereinafter with reference to the accompanying drawings, in which exemplary embodiments are shown. The invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying the invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing an embodiment of the invention. Those of ordinary skill in the art further understand that the exemplary hardware, software, processes, methods, and/or operating systems described herein are for illustrative purposes and, thus, are not intended to be limited to any particular named manufacturer.

Methods, systems, devices, computer programs, and computer program products according to embodiments of the invention provide a ring back service. This ring back service allows a called party to select a ring back that is heard by the calling party during a wait time between the time the calling party initiates the communication request and prior to when the calling party receives a resolution of the communication request. The communication request can be resolved by the called party accepting the communication request, such as by lifting the handset if the called party's communication device is a telephone. Other resolutions include rejecting the request, such as by returning a busy signal, or re-directing the communication request to voice mail or to another called party's communication device. That is, the called party determines the type of ring back heard by the calling party. The ring back can be audio, visual (such as images or video), and/or tactile feedback delivered to the calling party. For instance, the calling party might hear a favorite song, view a picture, view portions of a movie, or see other graphics. The called party might even select personal pictures, self-composed music, and/or streamed audio and/or video content (such as radio, stock quotes, news, weather, and/or advertisements). The called party might also specify ring backs by electronic calendar entries, such as the day of the week, the time of day, and/or appointments in the calendar. The called party may even associate particular ring backs to particular calling parties, thus providing a variety of personalized ring backs.

FIG. 1 is a simplified schematic of a network providing a ring back service. The calling party, using a calling party's communications device 10, initiates a communication request 12 to a called party's communications device 14. The communication 12 may be any form of electronic communication, such as an email, a page, a facsimile, a Plain Old Telephone System telephone call, and/or an Internet Protocol telephone call. Furthermore, as described in more detail below with reference to FIGS. 9 and 10, the devices 10 and 14 may be any type of communications device. The communication request 12 is routed from the calling party's communications device 10 to the called party's communications device 14 via a communications network 16. When the communication request 12 is received, the called party's communications device 14 provides an alert and may be programmed to ring, vibrate, flash, buzz, or otherwise alert the called party of the incoming communication request 12.

According to embodiments of the invention, the calling party's communications device 10 receives a ring back 18 during the wait time. While the called party's communications device 14 is alerting the called party, the calling party sees/hears/feels the ring back 18. This ring back 18 informs the calling party that the called party's communications device 14 is ringing, vibrating, or otherwise alerting of the incoming communication 12. That is, when the calling party sees/hears the ring back 18, the calling party recognizes that the called party's communications device 14 is ringing.

This ring back service, however, allows the called party to specify the ring back 18 that is presented to the calling party. When the calling party sees/hears the ring back 18, that ring back 18 is personalized by the called party. The ring back 18 may be any music, tone(s), and/or graphics selected by the called party. The called party, for example, may select an .mp3 file to be presented to the calling party. The calling party might hear Chopin, David Bowie, or any other music selected by the called party. As one example, the ring back may be the same ring selected by the called party to alert the called party of an incoming call. By selecting the same ring, the calling party and the called party will receive the same ring during the wait time. The calling party might also view a picture, portions of a movie, or other graphics. The called party might even select personal pictures, self-composed music, or other content. The called party could even specify streamed audio and/or video content, such as radio, stock quotes, news, weather, and/or advertisements. The called party could also use logical rules for specifying ring backs. These logical rules might specify ring backs by the month, the day of the week, and/or the time of day. As this patent will further explain, the called party may even associate particular ring backs to particular calling parties, thus providing a variety of personalized ring backs.

As mentioned above, the called party can select the ring back. The called party is intended to encompass more than just the individual user or owner of the called party's communications device 14 who can select or control the ring back. For instance, the called party may comprise an employer or other organization or entity that is associated with a group of communications devices. The Coca-Cola Company of Atlanta, Ga., for instance, may designate their latest corporate jingle as the ring back to be played whenever someone calls an employee of the company. Further, as described in more detail below, the called party may select the ring back by accepting a selection or group of ring back selections offered by a provider of ring backs or the communications service provider.

The network 16 may comprise any type of network and may actually comprise a plurality of interconnected networks. These networks include, but are not limited to, Public Switched Telephone Network (PSTN), the Internet, intranet, Public Branch Exchange (PBX), wireless network, satellite network, cable network, power network, and/or a home network. As will become more apparent from the description below, a ring back service according to an embodiment of the invention allows a mobile phone calling party to receive a ring back specified by the called party. As another example, a POTS calling party, a calling party using a cable network, and a calling party using Voice over Internet Protocol (VoIP) may also receive ring backs specified by the respective called parties.

Figure 2:
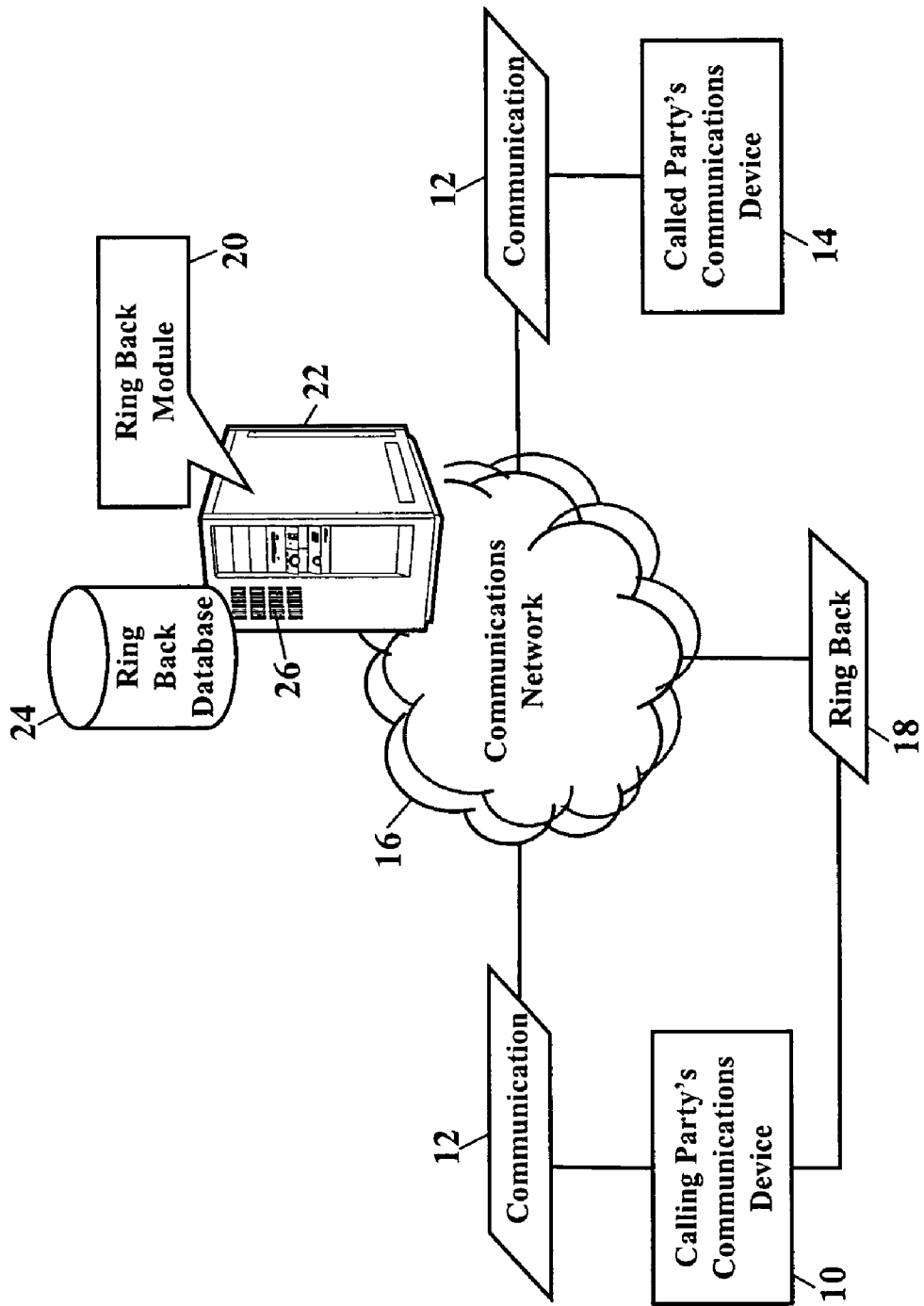
FIGS. 2-4 are more detailed schematics of networks providing this ring back service, according to the embodiments of the invention.
Figure 3:
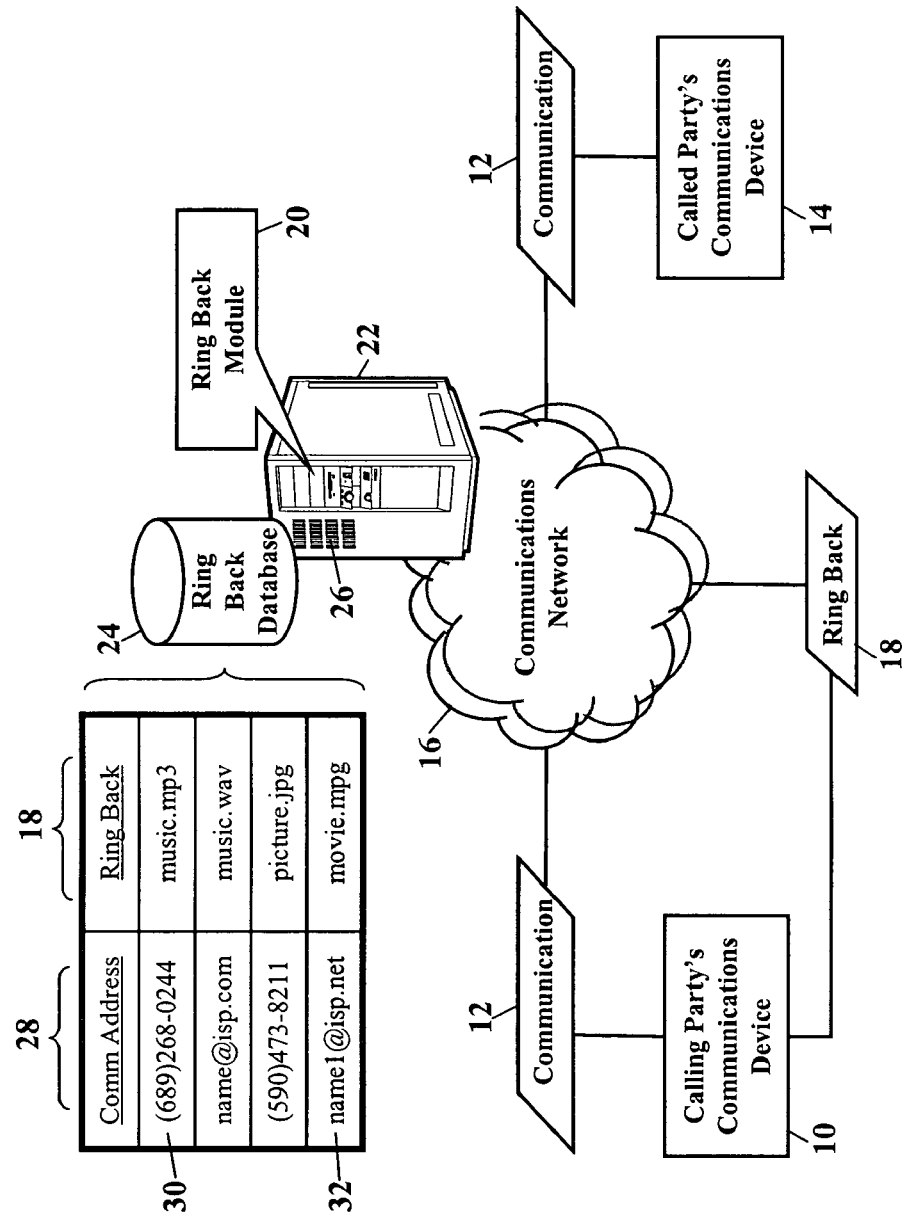
Figure 4:
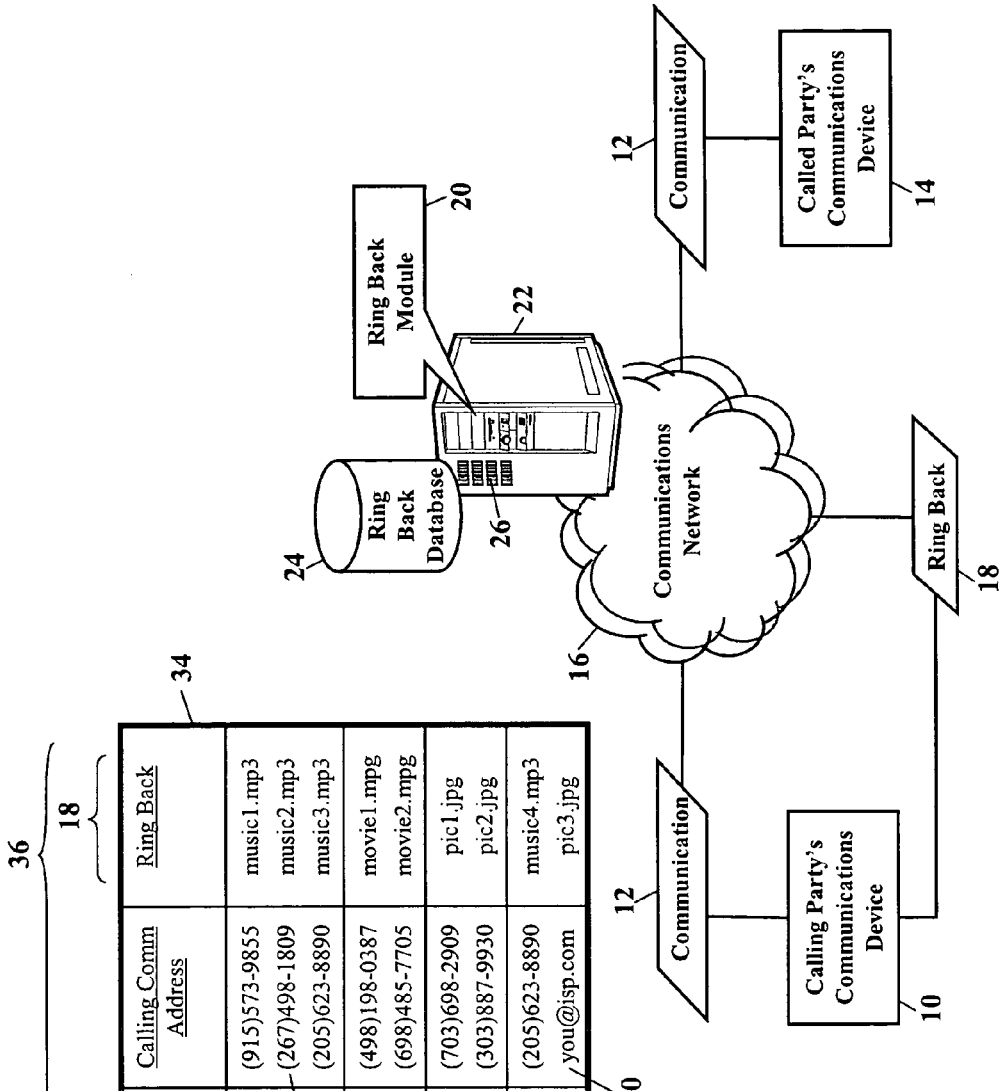

FIGS. 2-4 are more detailed schematics of networks illustrating this ring back service. When the communication request 12 is received, the called party's communications device 14 rings, vibrates, and/or otherwise alerts to the incoming communication request 12. The calling party's communications device 10, however, also receives the ring back 18. As FIG. 2 shows, a ring back module 20 manages the ring back service for the called party. The ring back module 20 comprises methods, systems, devices, computer programs, and/or computer program products that enable the ring back to be presented to the calling party. The ring back module 20 operates within any computer system, such as a communications server 22. The communications server 22 operates at any location within the communications network 16. As the communication request 12 is communicated to the called party's communications device 14, the ring back module 20 determines whether the ring back 18 is required. If the ring back 18 is required, the ring back module 20 queries a ring back database 24 stored in a memory 26 of the communications server 22. The ring back module 20 communicates the ring back 18 to the calling party's communications device 10. The ring back 18 is played/presented to the calling party during the wait time and can provide some entertainment to the calling party and also personalization for the called party.

As mentioned above, the called party can be given a great deal of control over what ring back is provided to a calling party. FIG. 3 illustrates one example of an association of ring tones for different called parties having this ring back service. The communication request 12 is diverted to the ring back module 20 which queries the ring back database 24 for the called party. If the called party is located in the ring back database 24, then the ring back database 24 also return communicates the ring back 18 associated with that called party. As Table A shows, the ring back database 24 stores a list of called parties subscribing to this ring back service. The ring back database 24 may identify/locate a called party according to name, physical address, social security number, and/or some other identifying information. The ring back database 24, however, typically identifies a subscriber according to a communications address 28. The communications address 28 may be a telephone number 30 and/or an email address 32. If either the subscriber's telephone number 30 or email address 32 is found in the ring back database 24, then the ring back database 24 retrieves and communicates the ring back 18 associated with the called party.

FIG. 4 illustrates another example of an association for this ring back service. The association shown in FIG. 3 retrieves one personalized ring back 18 per communications address 28. According to the association shown in FIG. 4, however, the called party can associate particular ring backs 18 to particular calling parties, thus providing a variety of personalized ring backs 18. Each called party could have a profile 34. Logically grouped within this profile 34 would be various called party-defined ring back associations 36. The called party could access their profile 34 via an interactive voice response system, a graphical user interface, or any other selection method. Rather than storing the association in the server 22, this association, as well as the one shown in FIG. 3, can be stored locally on the called party's communication device 14 or elsewhere on the network 16. As Table B shows, the called party may associate the calling party to the ring back 18. That is, the called party can enter the called party's communications address 28, calling parties' telephone numbers 38, and the associated ring backs 18 for those calling parties. The called party, of course, could also associate the called party's email address 32, the calling parties' telephone numbers 38, and the associated ring backs 18. The called party may even associate an initiating email address 40 to the ring back 18. Whether the calling party utilizes a communication device 14 having an address that comprises a telephone number, an email address 40, an IP address, or any other type of address, the called party may associate a personalized ring back to the calling party. However the called party defines their profile 34, the ring back database 24 communicates the personalized ring back 18 associated with the called party.

FIG. 4 also illustrates associations for multiple communications addresses 28. The called party may have a mobile telephone number 42, a home telephone number 44, and an office telephone number 46. The called party subscriber may choose to associate different ring backs 18, depending on the communications address 28. A caller to the called party's mobile telephone number 42 may receive a music file ring back 18, while that same caller to the called party's office telephone number 46 may receive a more subdued ring back 18. However the called party defines their profile 34, the ring back database 24 communicates the personalized ring back 18 associated with the called party's communications address 28 and the calling party.

FIGS. 3 and 4 are examples of ways in which the called party may associate ring backs 18 to calling parties. In general, the called party may select a ring back 18 based on any one or any combination of the called party's communications device 14, the calling party's communications device 10, the network 16, or the time of day. For instance, the ring back 18 may vary depending upon whether the calling party's communications device 10 is capable of displaying images or video or whether the device 10 can provide tactile feedback. Another factor that can be considered when selecting a ring back 18 includes the status of the called party's communication such as whether the device 10 is currently in use or busy, is available for handling a communication, is turned on or off, or some other status of the communication device 14. As further example, ring backs can be selected based on the type of calling party, whereby a telemarketer can receive a drastically different ring back than a family member. The ring backs can therefore be tied to whether caller ID information is provided and the contents of that caller ID data.

As another example, the ring back 18 can be tied to another source of data, such as third party data available through the network 16. For instance, the called party can instruct the ring back module 20 to tie the ring backs to current weather conditions for the called party. With this example, the ring back module 20 would query a third party source of weather data to retrieve local weather conditions, perform a look up in the called party's profile to determine which ring back to select, and then communicate the appropriate ring back to the calling party. Thus, the calling party can receive "Let it Snow" when it is snowing, "Rain Drops Keep Falling on My Head" when it is raining, or a song from Roger Hurricane Wilson if a hurricane is approaching. Instead of weather data, the third party data may be financial data such as whether a stock price is up or down during a day or sports data such as whether the local football team won its game the prior weekend. As apparent from the examples above, this third party data may be received in real-time or, alternatively, may be received only at certain times.

Instead of the called party selecting the ring back, the called party may opt for a default ring back or program of ring backs. Thus, rather than trying to select appropriate ring backs for weather conditions, a provider of the ring back service can formulate a weather program of ring backs that the called party can select. The called party may also opt for a random selection of ring backs or perhaps a selection of ring backs within a certain genre, such as songs from The Who or video clips from Clint Eastwood westerns. As another example, the ring back provider may provide seasonal ring backs that are tied to holidays or may provide a ring back program tied to a region, such as one for Atlanta, Ga. and another one for Chagrin Falls, Ohio.

Figure 5:
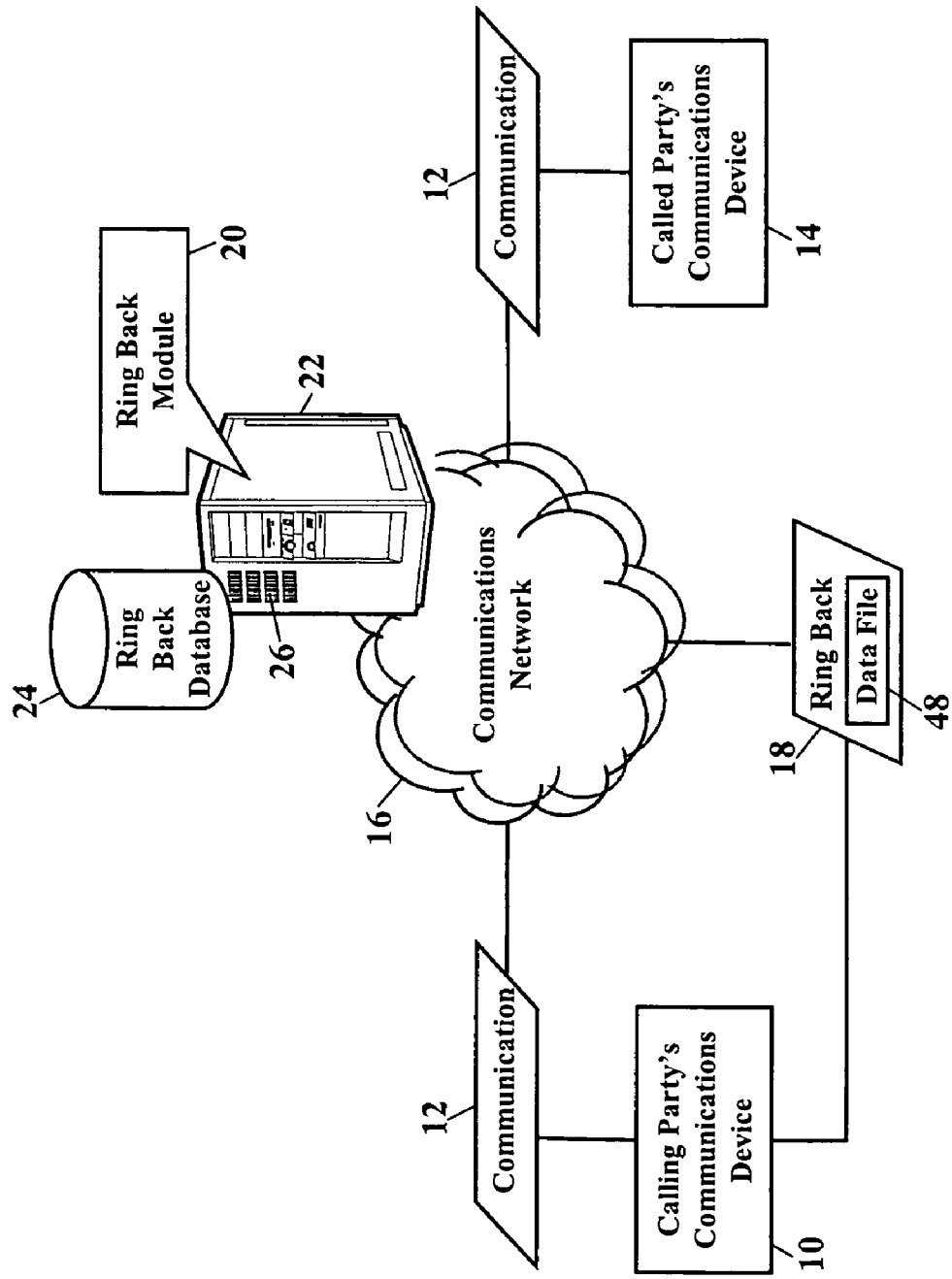
FIGS. 5 and 6 are schematics of networks further illustrating this ring back service, according to the embodiments of the invention.
Figure 6:
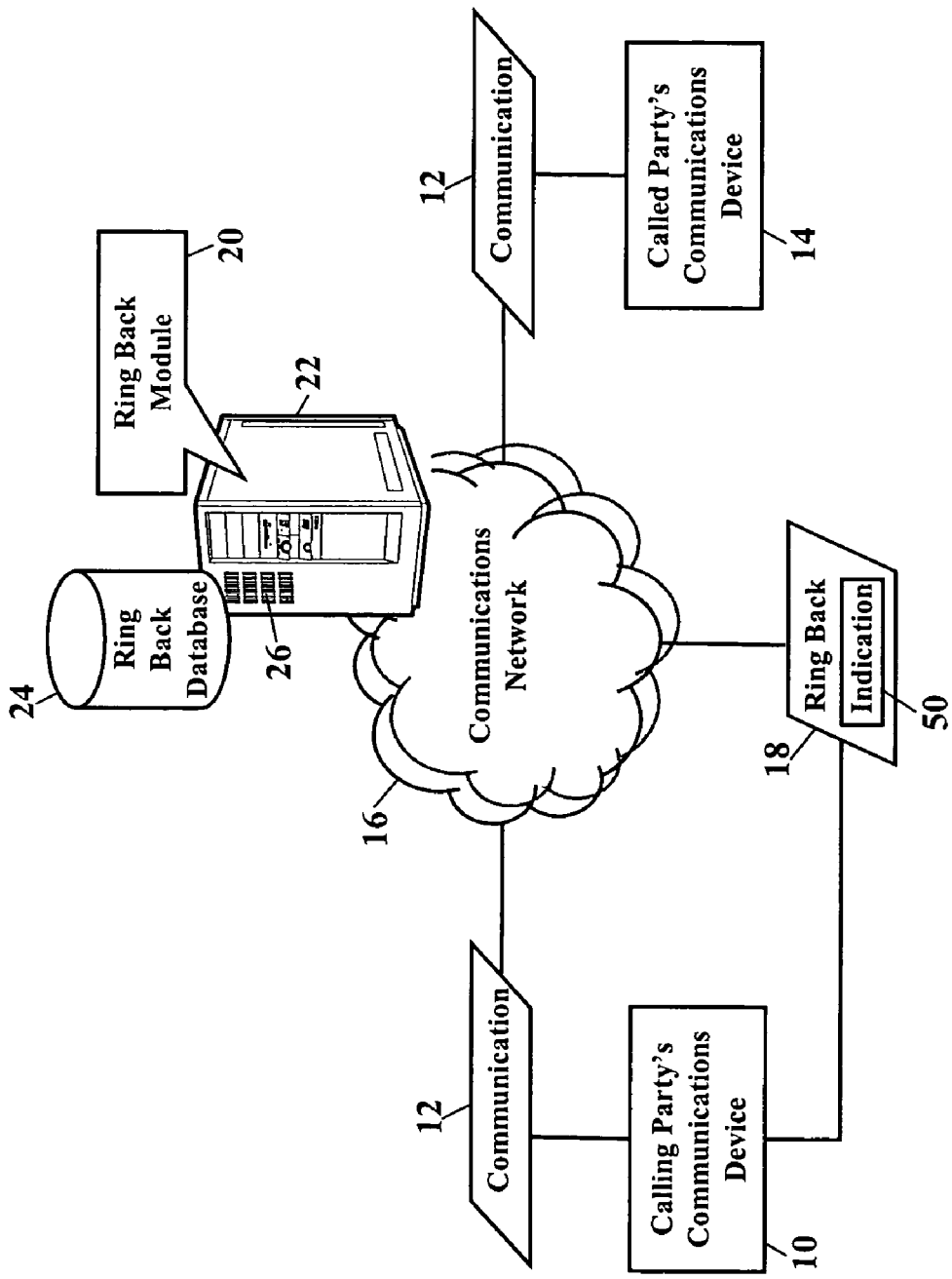

FIGS. 5 and 6 are schematics further illustrating networks that provide this ring back service. Here the ring back 18 may be a data file 48 and/or an indication 50 of the ring back. As the communication request 12 is processed for delivery to the called party's communications device 14, the ring back module 20 queries the ring back database 24. If the ring back 18 is required, the ring back module 20 retrieves and return communicates the personalized ring back 18. In the example of FIG. 5, the ring back module 20 actually delivers the ring back or causes the ring back to be delivered, such as through a ring back provider, to the calling party. In the example of FIG. 6, the ring back is not actually delivered but the ring back module 20 instead provides the indication 50 from which the calling party device 10 can retrieve the ring back. This indication 50 may be an identification of the ring back, such as by name or memory pointer, or a command instructing the calling party communication device 10 to retrieve the ring back. The ring back 18 is then presented on the calling party's communications device 10.

As FIG. 5 shows, the ring back 18 may comprise the data file 48. When the ring back module 20 retrieves and return communicates the ring back 18, the ring back 18 may include the data file 48. That is, the data file 48 is "pushed" to the calling party's communications device 10. The data file 48 comprises the ring back 18 that presents on the calling party's communications device 10. When the data file 48 is received by the calling party's communications device 10, the calling party's communications device 10 reads the data file 48, which can contain any music, tone(s), movie(s), and/or graphics selected by the called party.

As FIG. 6 shows, the ring back 18 may comprise the indication 50. When the ring back module 20 retrieves and return communicates the ring back 18, the ring back 18 may include the indication 50. The indication 50 indicates what ring back should be retrieved from memory and presented on the calling party's communications device 10. When the indication 50 is received by the calling party's communications device 10, the indication 50 instructs the calling party's communications device 10 to locally retrieve the appropriate ring back 18. The indication 50 may be a filename and/or a memory pointer. When the calling party's communications device 10 receives the indication 50, the calling party's communications device 10 locally retrieves and presents the appropriate ring back. The called party may thus specify the ring back from among those ring backs stored within the device 10. In this manner, the calling party may exert some control or censorship over the types of ring backs that may be presented on the device 10. If the ring back is not present in the device 10, then the device 10 would revert to the standard ring or a ring back selected by the calling party. Instead of retrieving the ring back from local memory, the indication 50 may be a pointer to a remote memory or a command on how to retrieve the ring back.

Figure 7:
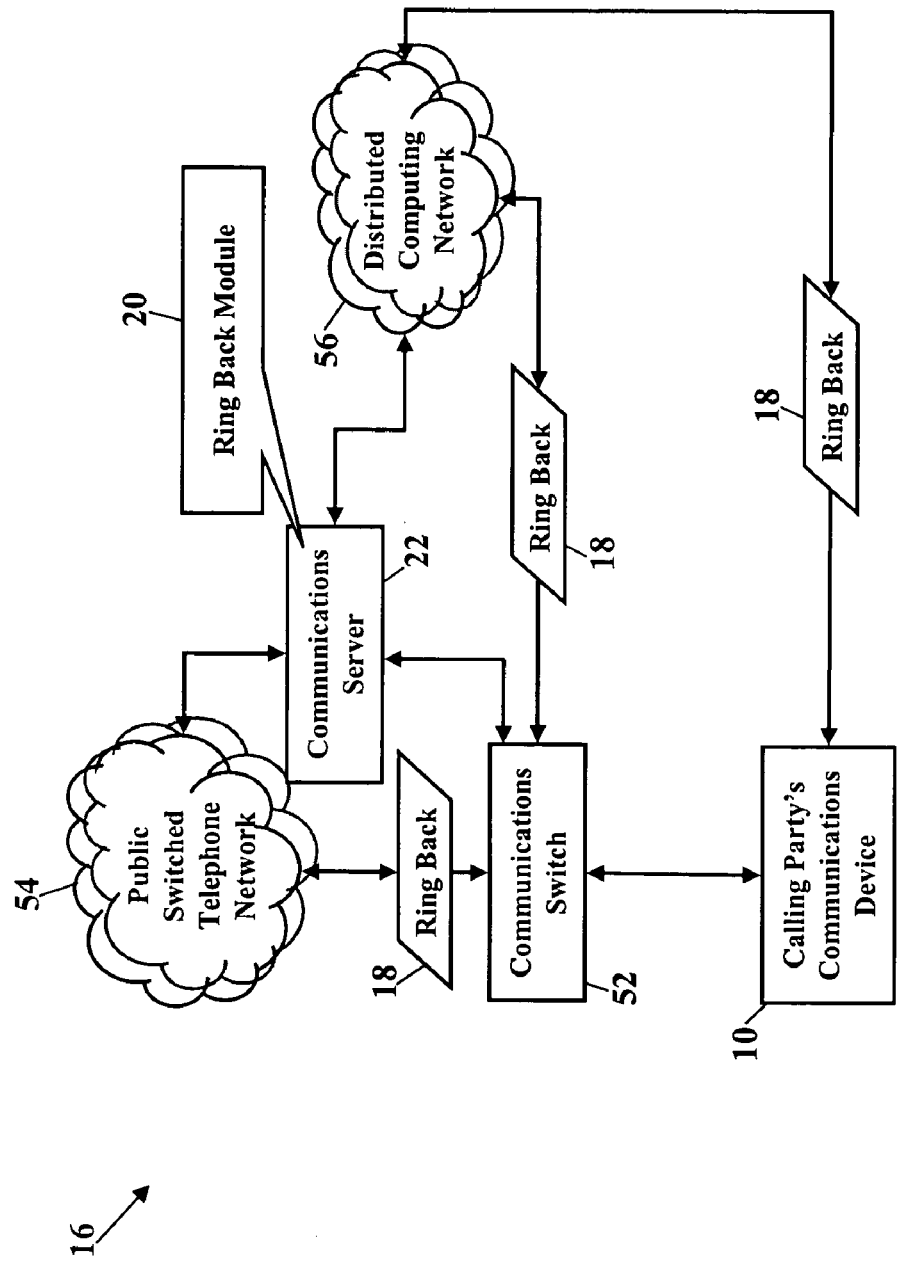
FIG. 7 illustrates an operating environment for the embodiments of the invention.

FIG. 7 illustrates an operating environment for embodiments of the invention. FIG. 7 is a schematic showing the ring back module 20 operating within the communications network 16. The ring back module 20 operates within the communications server 22, and the communications server 22 interfaces with a Public Switched Telephone Network 54 and with a distributed computing network 56. The communications network 16 also includes a communications switch 52 interfacing with the communications server 22, with the Public Switched Telephone Network 54, and with the distributed computing network 56. The communications server 22 interfaces with the communications switch 52 via a packet protocol, such as Session Initiation Protocol (SIP). The communications server 22 may include voice service protocols, triggers, and/or operations that allow the Public Switched Telephone Network 54 and the distributed computing network 56 to interoperate. The communications server 22 may be a packet-based "softswitch" that uses software control to provide voice, data, and video services by dynamically changing its connection data rates and protocols types. The communications switch 22 may alternatively or additionally include Advanced Intelligent Network (AIN) components controlling many features of the communications switch 22. In the AIN environment, signaling is initiated from the calling party's switch to the called party's switch and a trigger at the called party's switch causes a query that is ultimately routed to the ring back module 20. The ring back module 20 ensures that the ring back is being played at the calling party's communications device 10. The ring back module 10 may deliver the ring back along with a command to play the ring back. The communication device 10 may be ring back-capable and be programmed such that it plays the ring back until the device 10 detects activity, such as the called party answering the phone. As another example, the ring back module 20 can act as a Service Control Node (SCN) or gateway in delivering the ring back to the calling party communication device 10. The ring back module 10 may actually receive the call and, if the called party accepts the communication request 12, such as by lifting up a handset or pressing a button to answer the mobile phone, then the ring back module 20 bridges the call between the called party and calling party. In a wireless network, the called party may have a flag in their Home Location Register (HLR) which initiates the signaling to the ring back module 20. For a general description of conventional call routing, the reader is directed to U.S. Pat. No. 5,430,719 issued to Weisser (Jul. 4, 1995), with the "Summary of the Invention" and the "Detailed Description of the Preferred Embodiment" sections incorporated herein by reference. The reader is also directed to U.S. Pat. No. 5,917,817 issued to Dunn et al. (Jun. 29, 1999), with the "Summary of the Invention" and the "Detailed Description" sections incorporated herein by reference.

Figure 8:
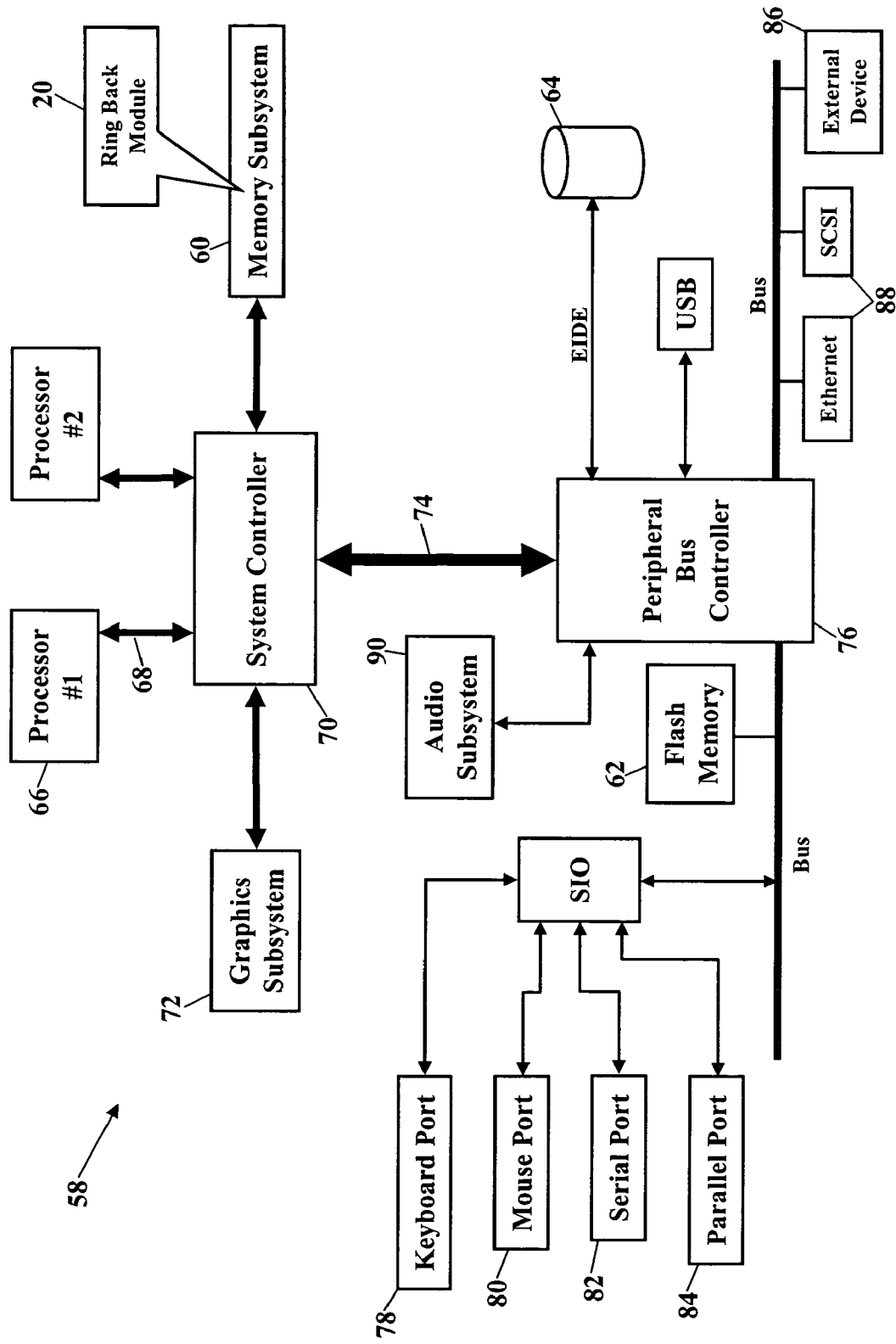
FIG. 8 depicts another operating environment for the embodiments of the invention.

FIG. 8 depicts another operating environment for an embodiment of the invention. FIG. 8 is a block diagram showing the ring back module 20 residing in a computer system 58 (such as the communications server 22 shown in FIGS. 2-7). The ring back module 20 operates within a system memory device. The ring back module 20, for example, is shown residing in a memory subsystem 60. The ring back module 20, however, could also reside in flash memory 62 or peripheral storage device 64. The computer system 58 also has one or more central processors 66 executing an operating system. The operating system, as is well known, has a set of instructions that control the internal functions of the computer system 58. A system bus 68 communicates signals, such as data signals, control signals, and address signals, between the central processor 66 and a system controller 70 (typically called a "Northbridge"). The system controller 70 provides a bridging function between the one or more central processors 66, a graphics subsystem 72, the memory subsystem 60, and a PCI (Peripheral Controller Interface) bus 74. The PCI bus 74 is controlled by a Peripheral Bus Controller 76. The Peripheral Bus Controller 76 (typically called a "Southbridge") is an integrated circuit that serves as an input/output hub for various peripheral ports. These peripheral ports could include, for example, a keyboard port 78, a mouse port 80, a serial port 82 and/or a parallel port 84 for a video display unit, one or more external device ports 86, and networking ports 88 (such as SCSI or Ethernet). The Peripheral Bus Controller 76 could also include an audio subsystem 90. Those of ordinary skill in the art understand that the program, processes, methods, and systems described in this patent are not limited to any particular computer system or computer hardware.

The central processor 66 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is WINDOWS® (WINDOWS® is a registered trademark of Microsoft Corporation, One Microsoft Way, Redmond Wash. 98052-6399, 425.882.8080, www.Microsoft.com). Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 60, flash memory 62, or peripheral storage device 64) may also contain an application program. The application program cooperates with the operating system and with a video display unit (via the serial port 82 and/or the parallel port 84) to provide a Graphical User Interface (GUI). The Graphical User Interface typically includes a combination of signals communicated along the keyboard port 78 and the mouse port 80. The Graphical User Interface provides a convenient visual and/or audible interface with a user of the computer system 58.

Figure 9:
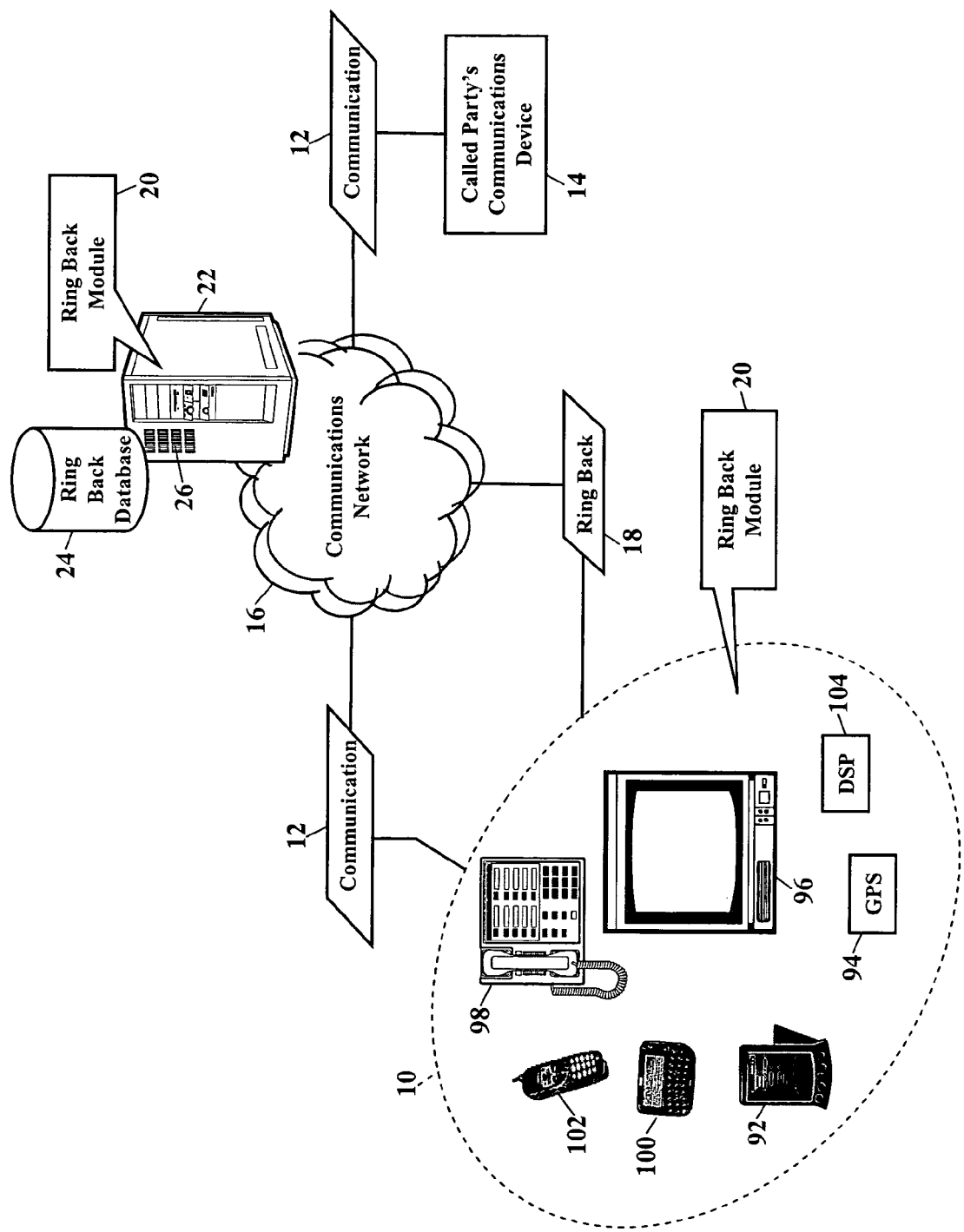
FIGS. 9 and 10 are schematics illustrating still more embodiments of the invention operating within various communications devices.
Figure 10:
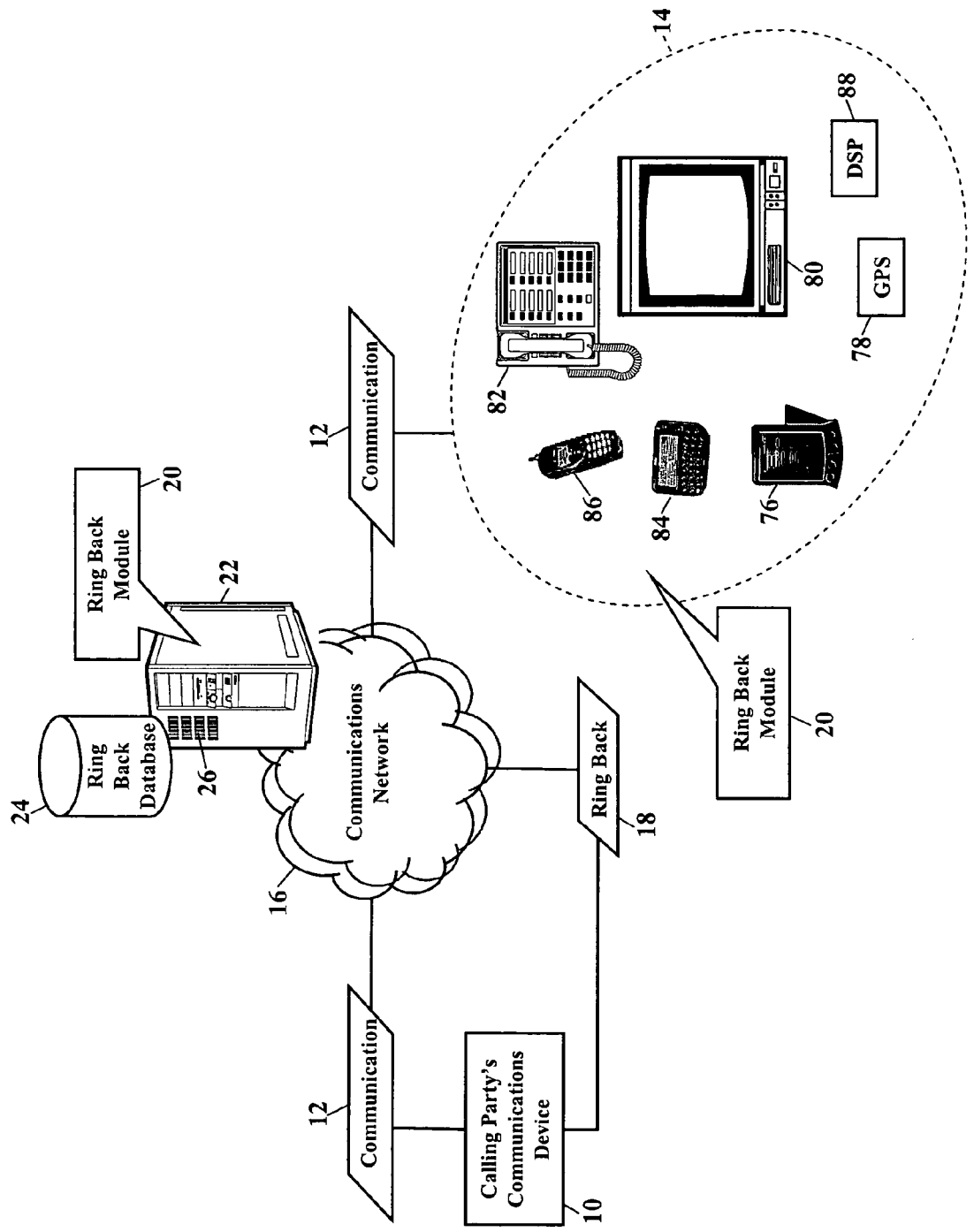

FIGS. 9 and 10 are schematics illustrating still more embodiments of the invention. FIGS. 9 and 10 illustrate that the ring back module 20 may alternatively or additionally operate within various communications devices. FIG. 9, for example, illustrates that the ring back module 20 may entirely or partially operate within various calling party communications devices 10. FIG. 10 illustrates that the ring back module 20 may also entirely or partially operate within various called party communications devices 14. As FIG. 9 shows, the ring back module 20 may operate in a personal digital assistant (PDA) 92, a Global Positioning System (GPS) device 94, an interactive television 96, an Internet Protocol (IP) phone 98, a pager 100, a cellular/satellite phone 102, or any computer system and/or communications device utilizing a digital signal processor (DSP) 104. FIG. 10, likewise, illustrates that the called party communications devices 14 may include the personal digital assistant (PDA) 92, the Global Positioning System (GPS) device 94, the interactive television 96, the Internet Protocol (IP) phone 98, the pager 100, the cellular/satellite phone 102, or any computer and/or communications device utilizing the digital signal processor (DSP) 104. The calling party's communications device 10, and/or the called party's communications device 14, may also include watches, radios, vehicle electronics, clocks, printers, gateways, and other apparatuses and systems.

Figure 11:
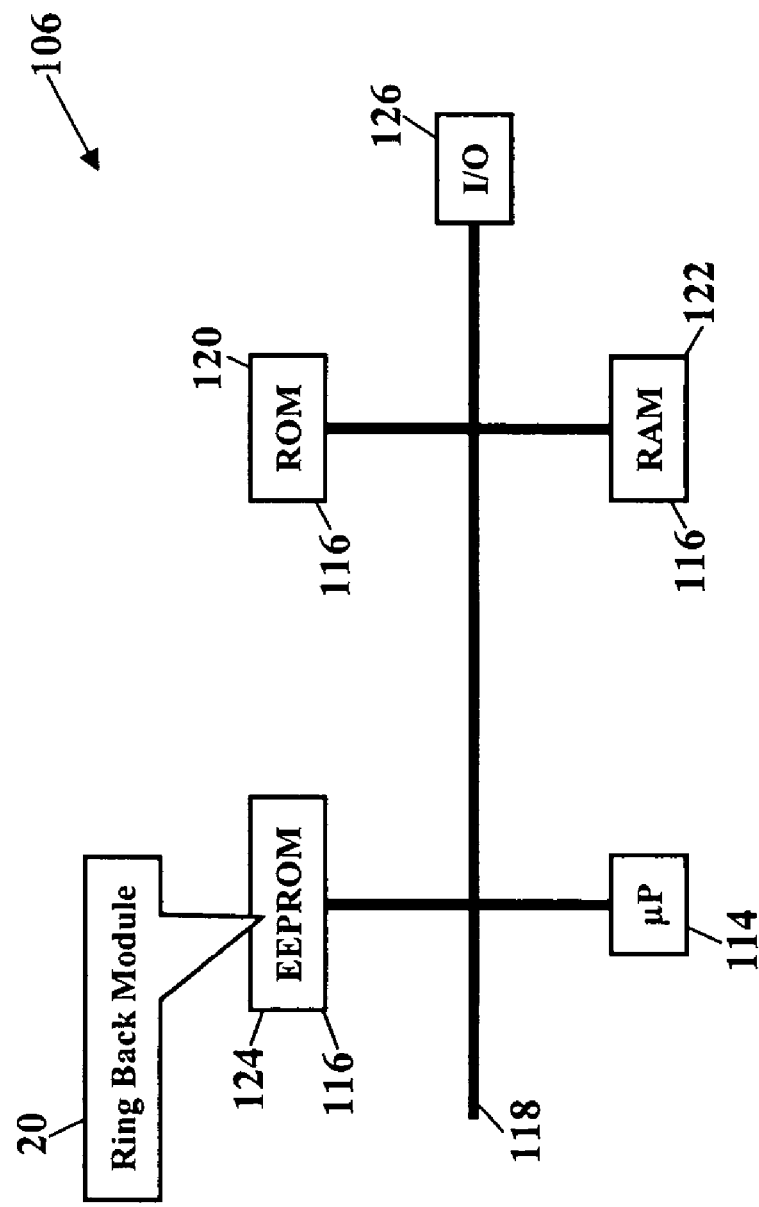
FIGS. 11-13 are schematics further illustrating various communications devices for presenting ring backs according to the invention.
Figure 12:
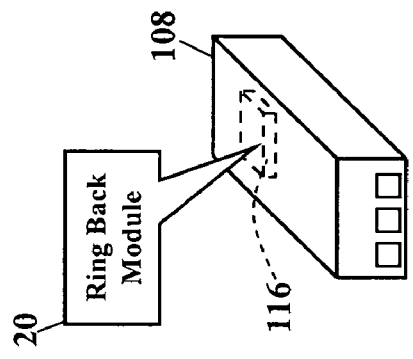
Figure 13:
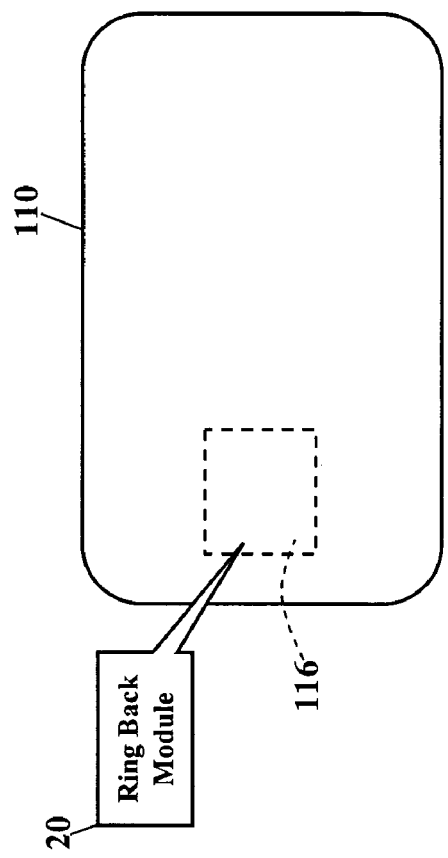

FIGS. 11-13 are schematics farther illustrating various communications devices for presenting ring backs according to the invention. FIG. 11 is a block diagram of a Subscriber Identity Module 106, while FIGS. 12 and 13 illustrate, respectively, the Subscriber Identity Module 106 embodied in a plug 108 and the Subscriber Identity Module 106 embodied in a card 110. As those of ordinary skill in the art recognize, the Subscriber Identity Module 106 is used in conjunction with many communications devices (such as the cellular/satellite phone 102 shown in FIGS. 9 and 10). The Subscriber Identity Module 106 stores user information (such as the user's International Mobile Subscriber Identity, the user's $K_i$ number, and other user information) and any portion of the ring back module 20. As those of ordinary skill in the art also recognize, the plug 108 and the card 110 each interface with the communications device according to GSM Standards 2.17 and 11.11 and ISO Standard 7816, with each incorporated herein by reference. The GSM Standard 2.17 is formally known as "European digital cellular telecommunications system (Phase 1); *Subscriber Identity Modules, Functional Characteristics* (GSM 02.17 V3.2.0 (1995-01))." The GSM Standard 11.11 is formally known as "Digital cellular telecommunications system (Phase 2+) (GSM); *Specification of the Subscriber Identity Module—Mobile Equipment (Subscriber Identity Module—ME) interface* (GSM 11.11 V5.3.0 (1996-07))." Both GSM standards are available from the European Telecommunication Standards Institute (650 route des Lucioles, 06921 Sophia-Antipolis Cedex, FRANCE, Tel.: +33 (0)4 92 94 42 00, Fax: +33 (0)4 93 65 47 16, www.etsi.org). The ISO Standard 7816 is formally known as "*Information technology—Identification cards—Integrated circuit(s) cards with contacts*," and the standard is available from the International Organization for Standardization (ISO) (l, rue de Varembé, Case, postale 56CH-1211 Geneva 20, Switzerland, Telephone +41 22 749 01 11, Telefax +41 22 733 34 30, www.iso.org).

FIG. 11 is a block diagram of the Subscriber Identity Module 106, whether embodied as the plug 108 of FIG. 12 or as the card 110 of FIG. 13. Here the Subscriber Identity Module 106 comprises a microprocessor (µP) 114 communicating with memory modules 116 via a data bus 118. The memory modules may include Read Only Memory (ROM) 120, Random Access Memory (RAM) and or flash memory 122, and Electrically Erasable-Programmable Read Only Memory (EE-PROM) 124. The Subscriber Identity Module 106 stores some or all of the ring back module 20 in one or more of the memory modules 116. FIG. 11 shows the ring back module 20 residing in the Erasable-Programmable Read Only Memory 114, yet the ring back module 20 could alternatively or additionally reside in the Read Only Memory 120 and/or the Random Access/Flash Memory 122. An Input/Output module 126 handles communication between the Subscriber Identity Module 106 and the communications device. Because Subscriber Identity Modules are well known in the art, this patent will not further discuss the operation and the physical/memory structure of the Subscriber Identity Module 106. If, however, the reader desires more information on the Subscriber Identity Module, the reader is directed to the following sources: LAWRENCE HARTE et al., GSM SUPERPHONES 99-100, 113-14 (1999); SIEGMUND REDL et al., GSM AND PERSONAL COMMUNICATIONS HANDBOOK 303-69 (1998); and JOACHIM TISAL, GSM CELLULAR RADIO TELEPHONY 99-130 (1997), with each incorporated herein by reference.

Figure 14:
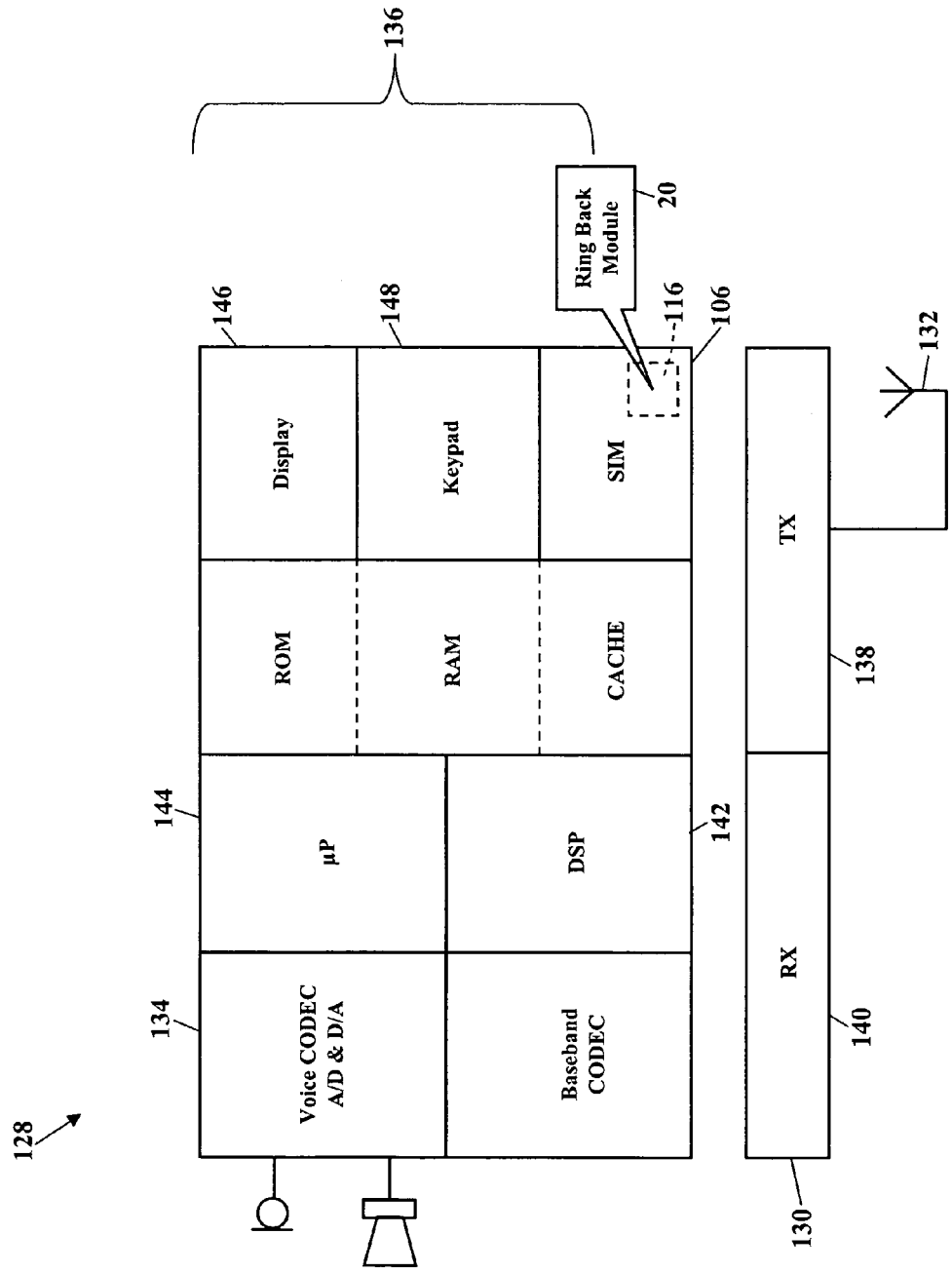
FIG. 14 is a schematic further illustrating various communications devices for presenting ring backs according to the invention.

FIG. 14 is a schematic further illustrating various communications devices for presenting ring backs according to the invention. FIG. 14 is a block diagram of another communications device 128 utilizing the ring back module 20 of the invention. Here the communications device comprises a radio transceiver unit 130, an antenna 132, a digital baseband chipset 134, and a man/machine interface (MMI) 136. The transceiver unit 130 includes transmitter circuitry 138 and receiver circuitry 140 for receiving and transmitting radio-frequency (RF) signals. The transceiver unit 130 couples to the antenna 132 for converting electrical current to and from electromagnetic waves. The digital baseband chipset 134 contains a digital signal processor (DSP) 142 and performs signal processing functions for audio (voice) signals and RF signals. As FIG. 14 shows, the digital baseband chipset 134 may also include an on-board microprocessor 144 that interacts with the man/machine interface (MMI) 136. The man/machine interface (MMI) 136 may comprise a display device 146, a keypad 148, and the Subscriber Identity Module 106. The on-board microprocessor 144 performs GSM protocol functions and control functions for the radio circuitry 138 and 140, for the display device 146, and for the keypad 148. The on-board microprocessor 144 may also interface with the Subscriber Identity Module 106 and with the ring back module 20 residing in the memory module 116 of the Subscriber Identity Module 106. The on-board microprocessor 144 may even censor and/or block presentation of the ring back according to a profile and/or preferences stored in memory (such as the memory modules shown as reference numeral 116 in FIG. 13). Because the communications device 128 includes the transceiver unit 130 coupled to the antenna 132 and the digital baseband chipset 134, the communications device 128 can wirelessly download additional ring backs. Because the functional architecture of the communications device 128 is well known to those of ordinary skill in the art, the communications device 128 will not be further discussed. If the reader desires a more detailed explanation, the reader is invited to consult the following sources: LAWRENCE HARTE et al., GSM SUPERPHONES 105-120 (1999); SIEGMUND REDL et al., GSM AND PERSONAL COMMUNICATIONS HANDBOOK 389-474 (1998); and JOACHIM TISAL, GSM CELLULAR RADIO TELEPHONY 99-130 (1997), with each incorporated herein by reference.

The ring back service may be applied to any signaling standard. As those of ordinary skill in the art recognize, FIGS. 11-13 illustrate a Global System for Mobile (GSM) communications device. That is, the communications device utilizes the Global System for Mobile (GSM) communications signaling standard. Those of ordinary skill in the art, however, also recognize embodiments of the invention are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard.

Figure 15:
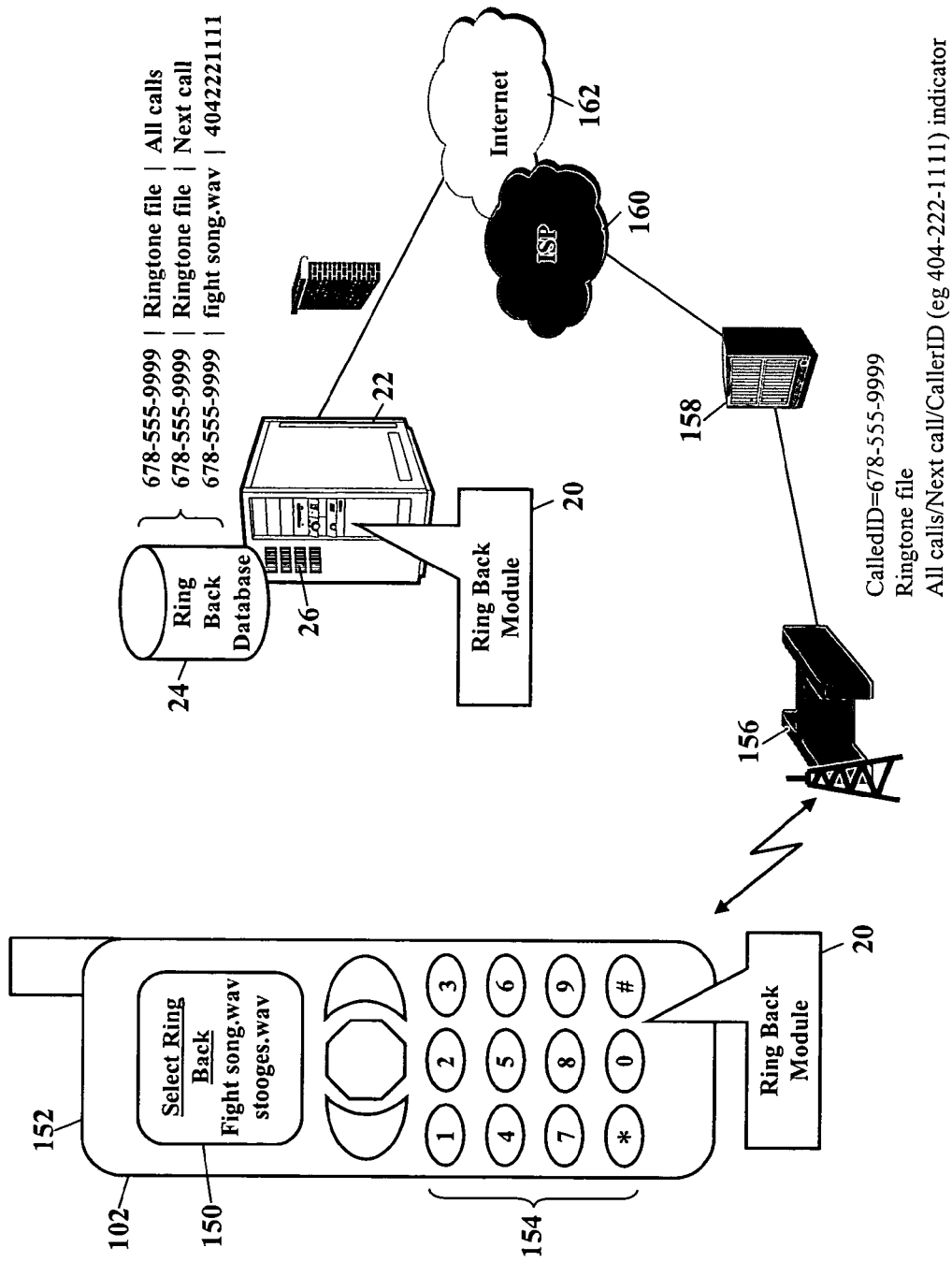
FIGS. 15-17 are schematics further illustrating this ring back service in a wireless environment.
Figure 16:
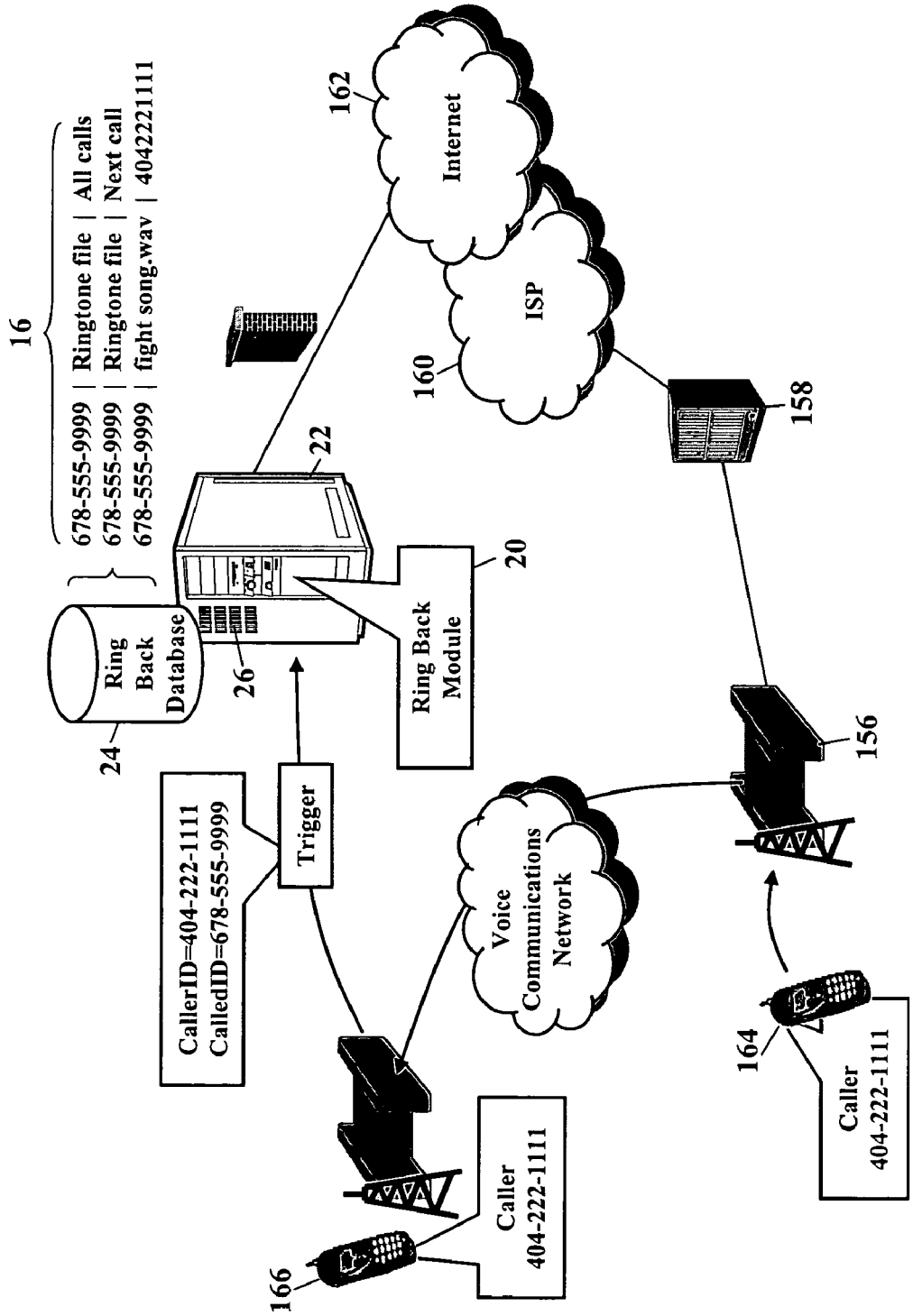
Figure 17:
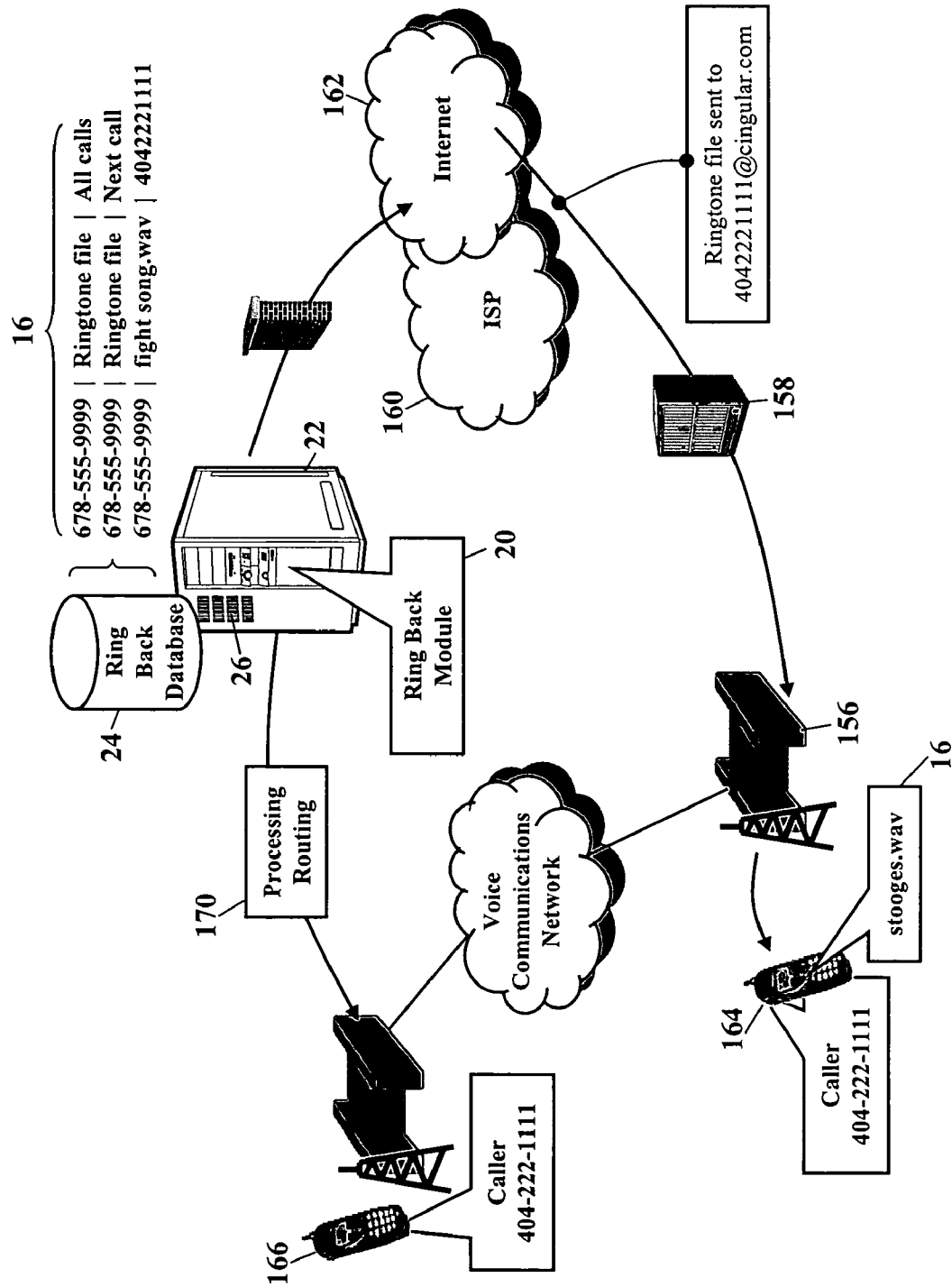

FIGS. 15-17 are schematics further illustrating networks that provide a ring back service. FIG. 15 illustrates a procedure for establishing this ring back service in a wireless environment. FIG. 16 illustrates placement of a call and retrieval of the ring back, while FIG. 17 illustrates "pushing" the ring back to the calling party. Beginning with FIG. 15, the called party associates a calling party to the desired ring back. The called party, for example, may use a graphical user interface 150 to select the desired ring back. FIG. 15 shows a communications device 152, such as the cellular/satellite phone 102, presenting the graphical user interface 150 to the called party subscriber. The graphical user interface provides a selection of ring backs to the called party. The called party uses a keypad 154 to scroll through the graphical user interface 150 and selects the desired ring back. The called party then associates a calling party with the desired ring back. The called party's selections are communicated during a data session communication, such as through an SMS message sent from the called party's communications device to the ring back service provider or the provider of the mobile service. The called party's selections communicate to the ring back module 20, and store in the ring back database 24, via a mobile switching center 156, via a gateway 158, via an Internet Service Provider (ISP) 160 to the Internet 162, and via the communications server 22. The ring back database 24 stores the subscriber's ring back associations, as previously explained.

FIG. 16 illustrates placement of a call and retrieval of the ring back. The calling party 164 places a call to the called party 166. The call routes to a mobile switching center 168 serving the called party 166. The called telephone number initiates a trigger 168. The trigger 168 is communicated to the ring back module 20 operating in the communications server 22. The trigger includes data representing the calling telephone number and the called telephone number. The ring back module 20 queries the ring back database 24 for the associated ring back 16. The ring back module 20 then retrieves the associated ring back 18.

FIG. 17 illustrates "pushing" the ring back 18 to the calling party 164. Once the associated ring back 18 is retrieved, that ring back 18 is return communicated to the calling party 164. As FIG. 17 shows, the ring back 18 is sent to the mobile switching center 156 via the Internet 162, the Internet Service Provider (ISP) 160, and the gateway 158. The ring back 18 ("stooges.wav") is then presented on the communications device 152. As FIG. 17 also shows, the ring back module 20 and/or the communications server 22 may also issue processing/routing instructions 170 for the call.

The teachings of the invention may also be applied to an Internet Protocol environment. When the call routes to the mobile switching center 168 serving the called party subscriber 166, the ring back module 20, operating in the communications server, analyzes the packets of data. The ring back module 20 may analyze a header portion of one or more packets of data and/or the ring back module 20 may analyze a payload portion of one or more packets of data. The header portion and/or the payload portion would include data representing the calling telephone number and the called telephone number. The ring back module 20 would use this data to query the ring back database 24 for the associated ring back 18. The ring back module 20 then retrieves the associated ring back 18, and that ring back 18 is return communicated to the calling party 164.

FIG. 18 is a flowchart illustrating a method of providing a ring back communications service to a called party. A graphical user interface is stored in memory (Block 172). The graphical user interface may be stored in the memory of a computer (such as the computer server 22), and the graphical user interface is accessed/downloaded via the Internet. The graphical user interface may additionally or alternatively be locally stored in the memory of a communications device. The graphical user interface presents a selection of ring backs to the called party. The selection of ring backs allows the called party to specify the ring back to be presented on a calling party's communications device. The called party may be allowed to preview a ring back (Block 174), thus allowing the called party to see, hear, feel, and/or otherwise experience the ring back before selection. The called party's selection of a ring back is accepted (Block 176), and the called party is allowed to associate the ring back to a telephone number of the calling party (Block 178). The selected ring back is processed (Block 180). The ring back presents to a calling party during the wait time until the communication request is either accepted or rejected.

The terms "processed," "process," "processing," and variants, as used herein, encompass any event from the time the calling party's communications device initiates a communication to the termination of the communication. The terms "processed," "process," "processing," and variants include storing the ring back in memory, routing a voice path, signaling setup, and intelligence queries (e.g., Local Number Portability queries, queries to retrieve Calling/Called Name/Number information, AIN queries, and standard signaling messages to determine call routing paths). The terms "processed," "process," "processing," and variants also include monitoring an established telephone call for possible DTMF entry, switch hook flash, other events that indicate a party on the telephone call has requested something, and delivery of call waiting tones and data. The terms "processed," "process," "processing," and variants also include identification of packets, of packet headers, and of the payload contents of packets. The terms "processed," "process," "processing," and variants include deciphering the header and/or payload contents of a packet and acting on those contents. The terms "processed," "process," "processing," and variants also include storing ring back selections in memory, retrieving those ring back selections, and communicating those ring back selections to the calling party. The terms "processed," "process," "processing," and variants, however, also encompass billing activities and measurements at a switch or any other network element.

As previously mentioned, censorship by the calling party is also permissible. The called party to this service can specify the ring back to be presented on a calling party's communications device. The calling party, however, may choose to block or censor the called party's selected ring back. The calling party may not approve of certain content for the ring back. The calling party may dislike some ring backs. The calling party, for example, may disapprove of lyrics, scenes, or other content in the ring back. According to one embodiment, the ring back service would also provide the calling party an opportunity to block or censor the called party's selected ring back. The calling party may maintain a profile in the ring back database 24. When the called party's ring back is retrieved, the ring back module 20 could cross-reference the called party's ring back to the calling party's list of approved/censored/block ring backs. If a match is found, the ring back module 20 would approve/decline the selected ring back. The calling party's profile may specify a default ring back to be presented to the calling party, in the event the called party's selected ring back is censored/blocked. The calling party's profile may even demand a mandatory ring back to be presented to the calling party, regardless of the called party's selected ring back.

Network selection of the ring back is also possible. The called party might provide a list of approved ring backs. The list could include any content, such as music, movies, pictures, streaming audio/video, or other content. The called party could then let the ring back module 20 select the ring back on behalf of the called party. That is, when the called party subscriber receives a communication (such as an email or a telephone call), the calling party would experience a ring back selected from the list. The ring back module 20 could use any method of selecting a ring back from the list. The ring back module 20, for example, could randomly select from the list, or the ring back module 20 could sequentially work through the list with each successive communication. However the ring back is selected, the ring back module 20 selects the ring back on behalf of the called party.

A ring back service according to an embodiment of the invention may also be applied to a shared communications device. Many families, for example, share a single communications device (e.g., computer, mobile phone, PDA). Because the communications device is shared amongst multiple users, the configuration parameters of the communications device can be switched to suit each user. The ring backs, likewise, may be personalized according to the profile of the user. Each sharing user could maintain a unique profile (such as the profile 34 in FIG. 4) of associated ring backs. When a user's profile is activated or configured, that user's ring back associations are also activated. The ring back module 20 may even use the calling party's telephone number to automatically select the appropriate profile and, thus, ring tone. When the calling party's telephone number, for example, is known to be a child's friend, the ring back module 20 could automatically select that child's profile and the associated ring back. When the calling party's telephone number is a friend of dad's, the ring back module 20 could automatically select dad's profile and the associated ring back. If the calling party's telephone number is a business, the ring back module 20 could default to a subdued ring back. The ring back module 20, then, could be programmed to recognize certain calling telephone numbers and to automatically switch to an associated profile and ring back.

The profile could also invoke other features. The ring back module 20, as mentioned above, can be programmed to recognize certain calling telephone numbers. The ring back module 20 may also be programmed to automatically forward a call to voicemail when a profile is not activated. Suppose, for example, mom has activated her profile on a communications device. If the calling party's telephone number is a child's friend, mom may choose to have the call forwarded to voicemail. Because the call is unlikely for mom, she may not want to receive the call. Mom, likewise, may choose to have the call forwarded to another number/destination.

A ring back service according to an embodiment of this invention may also be applied to busy signals. As most people know, when a telephone line is dedicated for a phone call and/or a data session, another caller hears a busy signal. This busy signal indicates the called party's line is engaged in a telephone/data session (e.g., Internet Call Waiting). The teachings of the invention could also be applied to customizable busy signals. That is, the called party uses this service to determine the type of busy signal heard by the calling party. The calling party might hear a favorite song, view a picture, view portions of a movie, or see other graphics. The subscriber might even select personal pictures, self-composed music, and/or streamed audio and/or video content (such as radio, stock quotes, news, weather, and/or advertisements). The called party might also specify a busy signal by electronic calendar entries, such as the day of the week, the time of day, and/or appointments in the calendar. The called party subscriber may even associate particular busy signals to particular calling parties, thus providing a variety of personalized busy signals.

A ring back service according to this invention may also be applied to user-to-user information. Although embodiments of the invention describe a ring back, the teachings may be applied to other information sent through, and transparent to, the communications network 16. Any electronic information that can accompany an electronic communication may be passed between the parties to the communication. Any notification and/or message, for example, could be communicated from the called party to the calling party. The called party specifies what electronic information is communicated to the calling party.

The ring back module (shown as reference numeral 20 in FIGS. 2-17) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the ring back module to be easily disseminated. A computer program product for providing ring backs to a calling party comprises the computer-readable medium and the ring back module. The ring back module is stored on the computer-readable medium and includes computer code/instructions. The ring back module provides a selection of ring backs to a called party, and the ring back module accepts the called party's selection of a ring back.

The ring back module may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method of providing a ring back to a calling party's communications device during a wait time, the wait time occurring after a communication request is received at a called party's communications device and before the calling party's communications device receives a resolution of the communication request, the method comprising:

receiving the communication request from the calling party's communications device;

diverting the communication request to a server;

querying a database accessible to the server for a called party;

retrieving financial data;

querying the database for the financial data and for a calling party; and retrieving the ring back associated with the financial data, with the called party, and with the calling party;

sending the communication request from the server to the called party's communications device; and routing the ring back from the server for delivery to a calling party, wherein the called party specifies the ring back to be played on the calling party's communications device during the wait time.

2. The method according to claim 1, further comprising associating a telephone number of the called party to the ring back.

3. The method according to claim 1, further comprising associating an email address of the calling party to the ring back.

4. The method according to claim 1, further comprising querying the database for the calling party.

5. The method according to claim 1, further comprising forwarding a name of the ring back from the server to the calling party's communications device.

6. The method according to claim 1, further comprising playing the ring back to the calling party's communications device.

7. The method according to claim 1, further comprising:

retrieving weather conditions associated with the calling party;

querying the database for the weather conditions and for the calling party; and retrieving the ring back associated with the weather conditions, with the called party, and with the calling party.

8. A method of providing a ring back to a calling party's communications device, comprising:

sending a communication request from the calling party's communications device to initiate a communication with a called party's communications device;

receiving an indicator of a ring back file associated with current weather conditions at the called party's communications device that has been selected by a called party for presentation to the calling party;

retrieving the ring back file from a local memory of the calling party's communications device; and playing the ring back on the calling party's communications device during a wait time occurring after the communication request is received at the called party's communications device and before the calling party's communications device receives a resolution of the communication request, wherein the called party specifies the ring back to be played on the calling party's communications device.

9. The method according to claim 8, wherein receiving the indicator of the ring back file comprises receiving a filename.

10. The method according to claim 8, wherein receiving the indicator of the ring back file comprises receiving pointer to the local memory where the ring back is stored.

11. The method according to claim 10, wherein the pointer identifies a location of the ring back.

12. The method according to claim 10, wherein the indicator comprises a command for retrieving the ring back.

13. The method according to claim 8, wherein the ring back comprises an audio file.

14. The method according to claim 8, wherein the ring back comprises an image file.

15. The method according to claim 8, wherein the ring back comprises a video file.

16. A communications device that allows selection of a ring back, comprising:

circuitry for communicating a communication request and for presenting a ring back during a wait time, the wait time occurring after the communication request is received at a called party's communications device and before a calling party's communications device receives a resolution of the communication request;

a ring back module stored in a memory device, the ring back module providing a selection of ring backs for presentation to a calling party during the wait time; and a processor communicating with the memory device and with the circuitry, the processor receiving an indication of the ring back associated with current weather conditions at the called party's communications device that has been selected by a called party to be retrieved from the memory device of the calling party's communications device, the processor retrieving the ring back from the memory device and presenting the ring back during the wait time.

17. The communications device according to claim 16, wherein when the ring back is not retrievable from the memory device of the calling party's communications device, then the processor retrieves a different ring back selected by the calling party, thus allowing the calling party to censor the ring back selected by the called party.

18. The communications device according to claim 16, wherein the circuitry and the processor permit wireless downloading of additional ring backs.

* * * * *